US006467345B1

(12) United States Patent
Neukermans et al.

(10) Patent No.: US 6,467,345 B1
(45) Date of Patent: Oct. 22, 2002

(54) METHOD OF OPERATING MICROMACHINED MEMBERS COUPLED FOR RELATIVE ROTATION

(75) Inventors: Armand P. Neukermans, Palo Alto; Timothy G. Slater, San Francisco, both of CA (US)

(73) Assignee: XROS, Inc., Santa Clara, CA (US)

( * ) Notice: Subject to any disclaimer, the term of this patent is extended or adjusted under 35 U.S.C. 154(b) by 0 days.

(21) Appl. No.: 09/518,364

(22) Filed: Mar. 3, 2000

Related U.S. Application Data

(63) Continuation-in-part of application No. 08/855,883, filed on May 12, 1997, now Pat. No. 6,044,705, which is a continuation-in-part of application No. 08/139,397, filed on Oct. 18, 1993, now Pat. No. 5,629,790, application No. 09/518,364, which is a continuation-in-part of application No. 08/595,042, filed on Jan. 31, 1996, now Pat. No. 5,648,618, which is a division of application No. 08/208,424, filed on Mar. 8, 1994, now Pat. No. 5,488,862, which is a continuation-in-part of application No. 08/139,397, filed on Oct. 18, 1993, now Pat. No. 5,629,790.

(60) Provisional application No. 60/023,311, filed on Jul. 31, 1996.

(51) Int. Cl.[7] .............................. G01C 19/00; G01P 9/00
(52) U.S. Cl. ................................................... 73/504.02
(58) Field of Search .................... 73/504.02, 504.03, 73/504.04, 504.12

(56) References Cited

U.S. PATENT DOCUMENTS

| 3,471,641 A | 10/1969 | Baker et al. ................. 178/7.6 |
| 3,614,312 A | 10/1971 | Fournier et al. ......... 178/7.3 R |
| 3,614,677 A | 10/1971 | Wilfinger ..................... 333/71 |
| 3,762,791 A | 10/1973 | Fournier et al. ............... 350/6 |
| 3,917,966 A | 11/1975 | Seiki et al. .................. 310/25 |
| 4,073,567 A | 2/1978 | Lakerveld et al. ........... 350/6.5 |
| 4,230,393 A | 10/1980 | Burke, Jr. .................... 350/6.5 |
| 4,317,611 A | 3/1982 | Petersen ...................... 350/6.6 |
| 4,421,381 A | 12/1983 | Ueda et al. .................. 350/6.6 |
| 4,441,791 A | 4/1984 | Hornbeck .................... 350/360 |
| 4,571,603 A | 2/1986 | Hornbeck et al. .......... 346/160 |

(List continued on next page.)

FOREIGN PATENT DOCUMENTS

| EP | 0834759 | 9/1997 | .......... G02B/26/08 |
| JP | 0107017 | 7/1985 | .......... G02B/26/10 |
| JP | 1118717 | 6/1986 | .......... G02B/26/10 |
| JP | 3264911 | 11/1991 | .......... G02B/26/10 |
| JP | 6208070 | 7/1994 | .......... G02B/26/10 |
| WO | 9503562 | 2/1995 | ............. G02F/1/01 |
| WO | 9801372 | 4/1998 | .......... G02B/26/12 |

OTHER PUBLICATIONS

Boxenhorn, B., et al., "Monolithic Silicon Accelerometer," Sensors and Actuators, A21–A23 (1990) pp. 273–277.

Breng, U., et al., "Electrostatic Micromechanic Actuators," Journal of Micro–mechanics and Microengineering, 2 (1992) pp. 256–261.

(List continued on next page.)

*Primary Examiner*—Richard A. Moller
(74) *Attorney, Agent, or Firm*—D. E. Schreiber, Esq

(57) ABSTRACT

A method for operating a monolithic, integrated, micromachined structure that includes a reference member and one or more dynamic members. Each dynamic member is supported from the reference member, either directly or indirectly, by torsion hinges. Supported in this way, each dynamic member exhibits a plurality of vibrational modes. Preferably, the structure is micromachined to establishes specified relationships between various pairs of vibrational modes. The method also includes applying force to each dynamic member that urges the member to rotate out of a rest position to a fixed particular angle.

71 Claims, 11 Drawing Sheets

U.S. PATENT DOCUMENTS

| | | | |
|---|---|---|---|
| 4,598,585 A | 7/1986 | Boxenhorn | 73/505 |
| 4,670,092 A | 6/1987 | Motamedi | 156/643 |
| 4,699,006 A | 10/1987 | Boxenhorn | 73/517 |
| 4,708,420 A | 11/1987 | Liddiard | 350/6.6 |
| 4,710,732 A | 12/1987 | Hornbeck | 332/7.51 |
| 4,732,440 A | 3/1988 | Gadhok | 350/6.6 |
| 4,856,863 A | 8/1989 | Sampsell | 350/96.16 |
| 4,859,012 A | 8/1989 | Cohn | 350/96.24 |
| 4,869,107 A | 9/1989 | Murakami | 73/517 R |
| 4,874,215 A | 10/1989 | Montagu | 350/6.6 |
| 4,919,500 A | 4/1990 | Paulsen | 350/6.6 |
| 4,942,766 A | 7/1990 | Greenwood et al. | 73/704 |
| 4,954,789 A | 9/1990 | Sampsell | 330/4.3 |
| 4,956,619 A | 9/1990 | Hornbeck | 330/4.3 |
| 4,991,964 A | 2/1991 | Forgey et al. | 356/371 |
| 5,016,072 A | 5/1991 | Greiff | 357/26 |
| 5,028,939 A | 7/1991 | Hornbeck et al. | 346/160 |
| 5,037,173 A | 8/1991 | Sampsell et al. | 385/17 |
| 5,097,354 A | 3/1992 | Goto | 356/212 |
| 5,101,236 A | 3/1992 | Nelson et al. | 355/229 |
| 5,111,693 A | 5/1992 | Greiff | 73/514 |
| 5,142,303 A | 8/1992 | Nelson | 346/108 |
| 5,155,778 A | 10/1992 | Magel et al. | 385/18 |
| 5,162,951 A | 11/1992 | Sorce | 359/871 |
| 5,196,714 A | 3/1993 | Garcia, Jr. et al. | 250/561 |
| 5,202,785 A | 4/1993 | Nelson | 359/214 |
| 5,203,208 A | 4/1993 | Bernstein | 73/505 |
| 5,212,582 A | 5/1993 | Nelson | 359/224 |
| 5,220,835 A | 6/1993 | Stephan | 73/517 R |
| 5,231,879 A | 8/1993 | Yamamoto | 73/517 R |
| 5,233,456 A | 8/1993 | Nelson | 359/214 |
| 5,241,861 A | 9/1993 | Hulsing, II | 73/505 |
| 5,247,180 A | 9/1993 | Mitcham | 250/492.1 |
| 5,251,485 A | 10/1993 | Kondo | 73/517 R |
| 5,256,869 A | 10/1993 | Lin et al. | 250/201.9 |
| 5,260,596 A | 11/1993 | Dunn et al. | 257/414 |
| 5,284,059 A | 2/1994 | Wan | 73/505 |
| 5,285,196 A | 2/1994 | Gale | 345/108 |
| 5,291,473 A | 3/1994 | Pauli | 369/112 |
| 5,331,852 A | 7/1994 | Greiff et al. | 73/505 |
| 5,392,151 A | 2/1995 | Nelson | 359/223 |
| 5,408,253 A | 4/1995 | Iddan | 347/260 |
| 5,444,566 A | 8/1995 | Gale et al. | 359/291 |
| 5,447,600 A | 9/1995 | Webb | 216/2 |
| 5,452,024 A | 9/1995 | Sampsell | 348/755 |
| 5,454,906 A | 10/1995 | Baker et al. | 216/66 |
| 5,457,566 A | 10/1995 | Sampsell et al. | 359/292 |
| 5,485,304 A | 1/1996 | Kaeriyama | 359/291 |
| 5,488,863 A | 2/1996 | Mochida et al. | 73/504.16 |
| 5,491,680 A | 2/1996 | Pauli | 369/112 |
| 5,508,841 A | 4/1996 | Lin et al. | 359/318 |
| 5,532,997 A | 7/1996 | Pauli | 369/112 |
| 5,535,047 A | 7/1996 | Hornbeck | 359/295 |
| 5,543,956 A | 8/1996 | Nakagawa et al. | 359/225 |
| 5,550,669 A | 8/1996 | Patel | 359/224 |
| 5,552,924 A | 9/1996 | Tregilgas | 359/224 |
| 5,563,398 A | 10/1996 | Sampsell | 235/454 |
| 5,579,148 A | 11/1996 | Nishikawa et al. | 359/214 |
| 5,579,151 A | 11/1996 | Cho | 359/291 |
| 5,592,239 A | 1/1997 | Hara et al. | 348/771 |
| 5,629,794 A | 5/1997 | Magel et al. | 359/290 |
| 5,640,214 A | 6/1997 | Florence | 348/743 |
| 5,654,741 A | 8/1997 | Sampsell et al. | 345/158 |
| 5,661,591 A | 8/1997 | Lin et al. | 359/290 |
| 5,665,997 A | 9/1997 | Weaver et al. | 257/414 |
| 5,671,083 A | 9/1997 | Conner et al. | 359/291 |
| 5,673,139 A | 9/1997 | Johnson et al. | 359/291 |
| 5,682,174 A | 10/1997 | Chiu | 345/84 |
| 5,696,619 A | 12/1997 | Knipe et al. | 359/224 |
| 5,754,217 A | 5/1998 | Allen | 347/239 |
| 5,771,116 A | 6/1998 | Miller et al. | 359/295 |
| 5,774,604 A | 6/1998 | McDonald | 385/18 |

OTHER PUBLICATIONS

Buser, R.A., et al. "Very High Q–factor Resonators in Monocrystalline Silicon," Sensors and Actuators, A21–A23 (1990) pp. 323–327.

Diem, B., et al. "SOI (SIMOX) as a Substrate For Surface Micromachining of Single Crystalline Silicon and Actuators," The 7th International Conference on Solid–State Sensors and Actuators, (1993) pp. 233–236.

Jaecklin, V.P., et al., "Mechanical and Optical Properties of Surface Micromachined torsional Mirrors in Silicon, Polysilicon and Aluminum," The 7th International Conference on Solid–State Sensors and Actuators, (1993) pp. 948–961.

Kleiman, R.N., et al., "Single–Crystal Silicon High–Q Torsional Oscillators," Rev. Sci. Instum. 56(11), Nov. 1985, pp. 2088–2091.

Pfann, W.G., et al., "Semiconducting stress transducers Utilizing the Transverse and Shear Piezoresistance Effects," Journal of Applied Physics, vol. 32, No. 10, (1961) pp. 2008–2016.

Wagner, B., et al. "Electromagnetic Microactuators with Multiple Degrees of Freedom," 1991 International Conference on Solid–State Sensors and Actuators, Digest of Technical Papers. (IEEE Cat. No. 91CH2817–5) pp. 614–617.

Petersen, K., "Silicon Torsional Mirror," Proceedings of the IEEE vol. 70, No. 5 (1982), pp. 61–62.

6) K. Gustafsson and B. Hok, "A Batch–Processed Optical Scanner", Proc. 12th Nordic Semiconductor Meeting, Jevnaker, Norway, Jun. 8–11, 1986, pp 282–85.

(13) P. B. Chu and K. S. J. Pister, "Analysis of Closed Loop Control of Parallel–Plate Electrostatic Microgrippers," Proc. IEEE Intl. Conf. robotics & Automatiion, 1994 pp. 820–825.

P. 002–008 "A New Force Sensor Incorporating Force–feedback Control For Inter–facial Force Mi roscopy". Stephen A. Joyce and J. E. Houston—Sandia National Laboratories, Albuquerque, New Mexico 87185 (Received Aug. 30, 1990; accepted for publication Nov. 19, 1990).

METHOD OF OPERATING MICROMACHINED MEMBERS COUPLED FOR RELATIVE ROTATION

CROSS REFERENCE TO RELATED APPLICATIONS

Continuation-in-part of Ser. No. 08/855,883 filed May 12, 1997, U.S. Pat. No. 6,044,705 that is:

1. a continuation-in-part of Ser. No. 08/139,397, filed Oct. 18, 1993, U.S. Pat. No. 5,629,790; and 2. a continuation-in-part of Ser. No. 08/595,042, filed Jan. 31, 1996, U.S. Pat. No. 5,648,618, which is a division of Ser. No. 08/208,424 filed Mar. 8, 1994, U.S. Pat. No. 5,488,862, that is also a continuation-in-part of Ser No. 08/139,397, filed Oct. 18, 1993, U.S. Pat. No. 5,629,790.

This application claims benefit of provisional application Ser. No. 60/023,311 filed Jul. 31, 1996.

BACKGROUND OF THE INVENTION

1. Field of the Invention

The invention relates generally to silicon micromachining, and in particular to micromachining torsion hinges that couple for relative rotation two members such as those included in optical beam vibratory scanners.

2. Description of the Prior Art

Beam scanners are used in digital imaging, printing, bar code readers, optical reading and writing systems, surface inspection devices and various scientific and industrial implements. Such scanners deflect a beam of light, usually from a fixed source, over an angle ranging from several degrees to tens of degrees. The beam sweeps back and forth at a frequency determined in part by the mirror resonant frequency. A typical vibrational scanner of the prior art is described in U.S. Pat. No. 4,732,440 to J. Gadhok. The idea of making torsional scanners within a silicon body was proposed at an early date by K. Peterson, Proc. IEEE, vol. 70, no. 5, p. 61, May 1982. See also U.S. Pat. No. 4,317,611 to K. Peterson.

FIG. 1, depicting a scanner shown in FIG. 39 of Peterson, Proc. IEEE, supra, p. 61, includes a micromachined torsional mirror 11, supported by torsion bars 13 and 15 within silicon body 17 ("micro scanner" hereafter). The aforementioned article describes typical mirror parameters, such as the modulus of silicon, the typical wafer thickness, the length of the torsion bar and the dimensions of the mirror. The width of the torsion bars is on the order of 500 micrometers, while the length of the torsion bars is approximately 0.2 centimeters. The mirror is approximately 0.22 centimeters on a side. The cut which isolates the mirror from the silicon body and also defines the torsion bars is approximately 0.02 centimeters in thickness. Each cut is made by anisotropically etching the silicon. The silicon body rests on glass substrate 21 which has vapor deposited electrodes 23 and 25. A depression 27 is etched into the glass to receive silicon body 17 which rests on a linear support ridge 29. A high voltage is applied first to one electrode then the other in a continuing out-of-phase sequence from a drive circuit. The electric field generated by the electrodes tilts the mirror first to one side and then the other. The restoring force of the torsion bars works against each deflection. The resonant frequency of the mirror can be calculated with well known formulas cited in the above-mentioned articles, although air damping creates an error in the resonance frequency. The substrate, electrodes and drive circuit are part of the micro scanner.

Two dimensional micromachined silicon flexure structures, used as gyroscopes, are known in the art. See U.S. Pat. No. 5,016,072 to P. Greiff. Such structures are similar to micro scanners in construction and vibratory characteristics.

One of the problems encountered in the prior art is in restricting vibrations to a single desired torsional mode. An object of the invention was to devise a micro scanner which vibrates at a single desired mode of vibration and to be self-oscillating at its natural fundamental frequency. Another difficulty with the prior art structures and fabrication methods is an inability to control, balance, or eliminate stress in micromachined plates or frames. Yet another difficulty encountered in fabricating micro scanners is obtaining very high quality mirrors and torsion bars that have a specified thickness and, and, if desired, that are extremely thin.

U.S. Pat. No. 4,365,863 entitled "Optical Switch for a Very Large Number of Channels" that issued Dec. 28, 1982, on an application filed by Georges J. G. Broussaud ("the Broussaud patent") discloses an optical switching system that has two optical fiber arrays which face one another. In the space between these two arrays, a pair of deflectors angularly redirect a beam of light emitted by an optical fiber in one of the arrays through free space and into a selected one of the many optical fibers in the facing array. This patent discloses that the deflectors may be provided by an optical-mechanical device that operates on the principle of the diasporameter. The Broussaud patent also discloses that pairs of acousto-optical deflectors, that deflect light by photon-phonon interaction within a crystal medium, arranged in a cross configuration may also provide the deflector.

A paper by Kari Gustafsson and Bertil Môk entitled "Fiberoptic Switching And Multiplexing With a Micromechanical Scanning Mirror" published at pages 212–215 of the describes a fiberoptic switch and multiplexer. This fiberoptic switch and multiplexer uses micromechanical mirrors vibrating torsionally at a resonant frequency of approximately 40 hKz to repetitively couple light periodically between a pair of optical fibers. If the torsionally vibrating mirrors disclosed in this paper could, instead, be held stationary at a fixed particular angle, and if instead of rotating about a single axis such mirrors could rotate through a sufficiently large angle about a pair of non-parallel axes, then micromechanical mirrors could be substituted for the optical-mechanical or acousto-optical deflectors described in the Broussaud patent.

BRIEF SUMMARY OF THE INVENTION

An object of the present invention is to provide a method of operating a micromechanical structure which includes a dynamic member that can rotate either about a single axis, or about a pair of non-parallel axes, in which the dynamic member is held stationary at a fixed particular angle.

Another object of the present invention is to provide a method of operating a micromechanical mirror for reflecting a beam of light that can rotate either about a single axis, or about a pair of non-parallel axes, in which the mirror is held stationary at a fixed particular angle.

Briefly, the present invention is a method for operating an integrated, micromachined structure that includes providing a micromachined structure that is monolithically fabricated from a stress-free semiconductor layer of a silicon substrate. In one embodiment of the method the micromachined structure includes a reference member, a first pair of torsion hinges projecting from the reference member, and a first dynamic member that is coupled only by the first pair of torsion hinges to the reference member. The first pair of torsion hinges supports from the reference member in a first rest position with respect to the reference member if no external force is applied to the first dynamic member. The first pair of torsion hinges alone also support the first dynamic member for rotation about a first axis with respect to the reference member. The first dynamic member, as supported only by the first pair of torsion hinges, exhibits a plurality of vibrational modes with respect to the reference member including a principal torsional vibrational mode of rotation about the first axis, a vertical shaking vibrational mode, a vertical rocking vibrational mode, a lateral shaking vibrational mode, and a lateral rocking vibrational mode. Each vibrational mode of the first dynamic member has a vibrational frequency.

In this particular embodiment of the method the micromachined structure the first dynamic member includes a frame to which the first pair of torsion hinges couple, and from which project a second pair of torsion hinges that are oriented non-parallel to the first pair of torsion hinges. The first dynamic member of this particular embodiment of the method also includes a second dynamic member that is coupled only by the second pair of torsion hinges to the frame. The second pair of torsion hinges support the first dynamic member in a second rest position with respect to the frame if no external force is applied to the second dynamic member. The second pair of torsion hinges, the frame, and the first pair of torsion hinges alone also support the second dynamic member for rotation about a second axis with respect to the frame and about the first axis with respect to the reference member. The second dynamic member, as supported only by the second pair of torsion hinges, the frame, and the first pair of torsion hinges, exhibits a plurality of vibrational modes with respect to the frame including a principal torsional vibrational mode of rotation about the second axis, a vertical shaking vibrational mode, a vertical rocking vibrational mode, a lateral shaking vibrational mode, and a lateral rocking vibrational mode. Each vibrational mode of the second dynamic member has a vibrational frequency.

The method also includes applying a first force to the first dynamic member that urges the first dynamic member to rotate about the first axis out of the first rest position to a fixed particular angle with respect to the reference member. The method further includes applying a second force to the second dynamic member that urges the second dynamic member to rotate about the second axis out of the second rest position to a fixed particular angle with respect to the frame.

These and other features, objects and advantages will be understood or apparent to those of ordinary skill in the art from the following detailed description of the preferred embodiment as illustrated in the various drawing figures.

DETAILED DESCRIPTION

Figure 1:
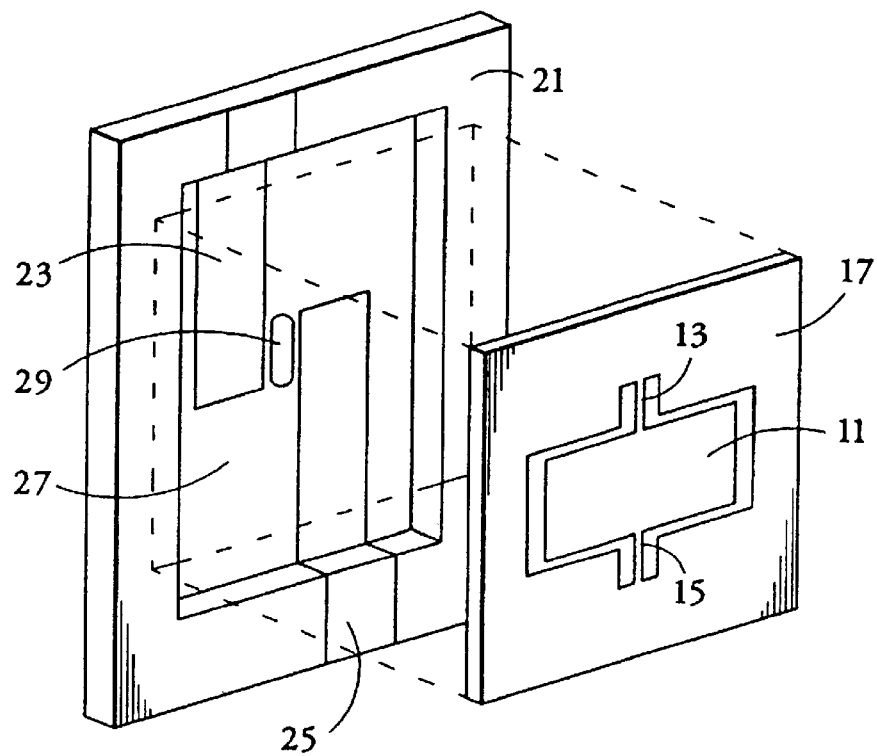
FIG. 1 is a perspective assembly view of a micro scanner of the prior art.
Figure 1A:
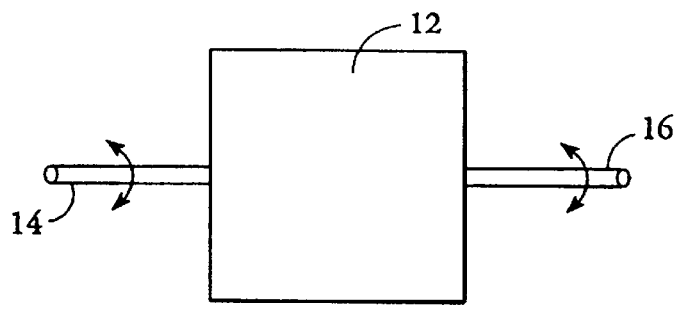
FIGS. 1a–1e illustrate micro scanner mirror vibrational modes.
Figure 1B:
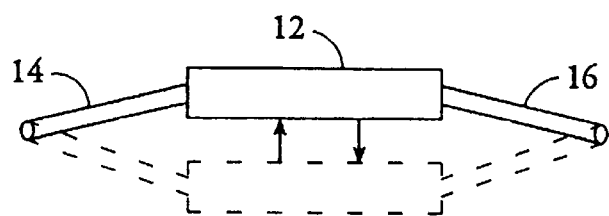

With reference to FIGS. 1a–1e, various vibrational modes of torsional scanners are shown. FIG. 1a depicts a top view of a desired or principal torsional mode of a micro scanner in accord with the present invention. This mode is designated as mode 1 herein. The scanning mirror 12 has opposed axes 14 and 16 which twist in the direction shown by the arrows. In FIG. 1b, a vertical shaking mode is shown in a side view wherein the mirror 12 is moving up and down in the directions shown by the arrows, leaving a horizontal plane. This mode is designated as mode 2 herein.

Figure 1C:
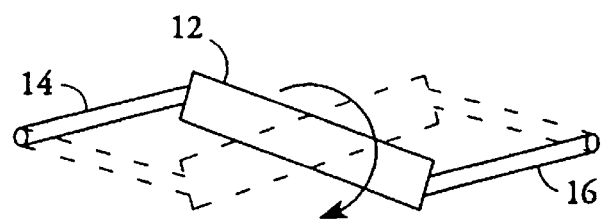
Figure 1D:
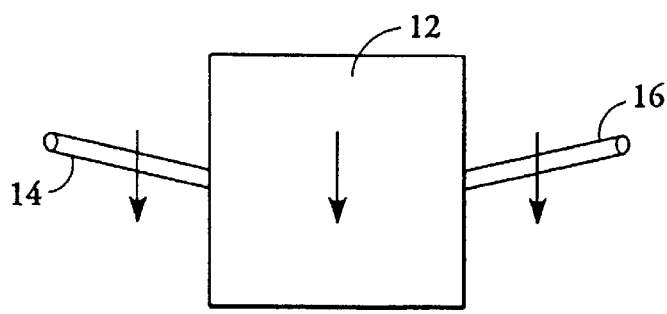
Figure 1E:
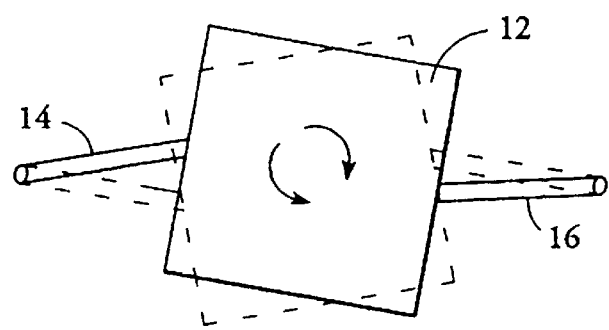

FIG. 1c shows mirror 12 in a vertical rocking mode in which the mirror also leaves a horizontal support plane at the ends of the mirror, but not at the center. This is herein designated as mode 3. FIG. 1d shows a lateral shaking mode where the mirror 12 moves first in one direction, then in an opposite direction within the support plane. This will be termed mode 4 herein. FIG. 1e shows a lateral rocking mode in which the mirror 12 twists in one direction, then twists in an opposite direction, within the horizontal support plane. This will be termed mode 5 herein. Modes 2–5 are undesired, but cannot be completely eliminated. Other modes, called plate modes, are possible but for most applications, the frequency of plate modes are much higher and would be removed if separation is achieved with respect to the modes which have been illustrated. More complex modes are also possible, again usually at higher frequencies. In the present invention, the frequencies of modes 2–5 are separated from the frequency of mode 1 by a minimum frequency ratio. By maintaining an adequate separation, between the lower torsion mode and the next higher mode, less energy is transferred to these undesired modes. In the present invention, the frequencies of the various modes are shown in the following table for a typical configuration:

TABLE 1

| | Vibrational Frequency (Hz) | | | |
| --- | --- | --- | --- | --- |
| | Mode 1 | Mode 2 | Mode 3 | Mode 4 |
| High Freq | 14,100 | 71,400 | 123,000 | 214,000 |
| Mid Freq | 1,500 | 3,200 | 5,500 | 15,900 |
| Low Freq | 92 | 930 | 1,600 | 18,500 |

In general the separations described above for the torsional mode at any given frequency range are achieved by designing the torsion hinges as thin and narrow as possible, yet adequately thick to withstand impact forces in the environment in which the micro mirror is used. When driving a micromachined mirror, certain forces described below are applied asymmetrically. For example, spaced apart electrodes can drive one-half of the mirror and then at a later time the other half. On the other hand, other forces, such as magnetic forces, cause a symmetric application of the driving couple. In the symmetric application, the vibrational frequency of the torsional mode may be closer to the undesired modes, say within twenty percent. For the asymmetric application, the separation should be at least thirty percent.

Figure 2:
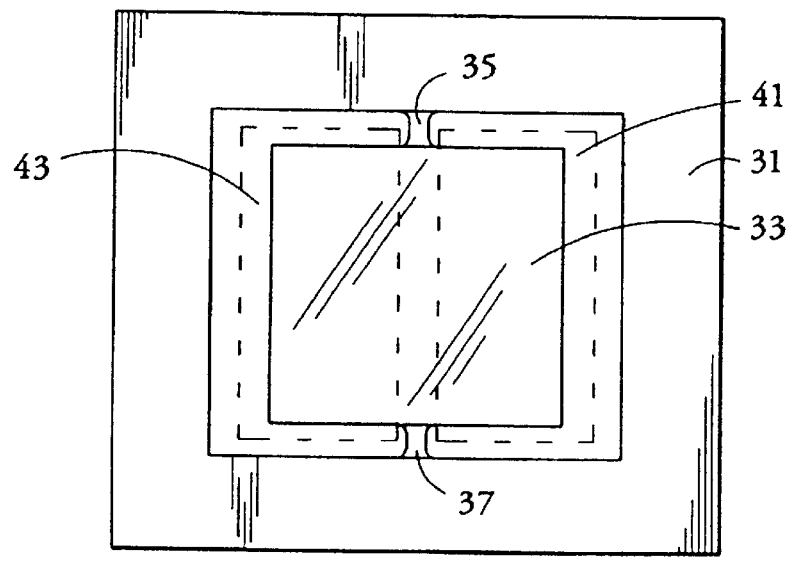
FIG. 2 is a top view of a micro scanner in accord with the present invention.

With reference to FIG. 2, a section 31 of a silicon wafer is shown. The wafer is etched to define a smaller wafer section 33 supported within the larger section 31 by means of torsion hinges 35 and 37 which are integral to both sections. The surface of smaller section 33 is polished in the manner of commercial silicon wafers so that it has a shiny, reflective surface. Mounted either below or above the wafer and slightly spaced therefrom are the electrodes 41 and 43, indicated by dashed lines. These electrodes will be alternately charged by voltages which cause electric fields which attract the smaller section 33, hereafter referred to as mirror 33, which is electrically grounded through the torsion hinges and to the surrounding larger section. Note that there is no fulcrum or backplane support as in FIG. 1. Only the torsion hinges provide support. Apart from this, the overall design of the scanner mirror of the present invention, up to this point, may be in accord with the prior art. However, the mass of the mirror and the dimensions of the torsion hinges and perhaps other variables are selected so that the torsional mode is well separated. Also, the electronic circuitry associated with one of the torsion hinges, described below, as well as torsion hinge support radii are new.

Figure 2A:
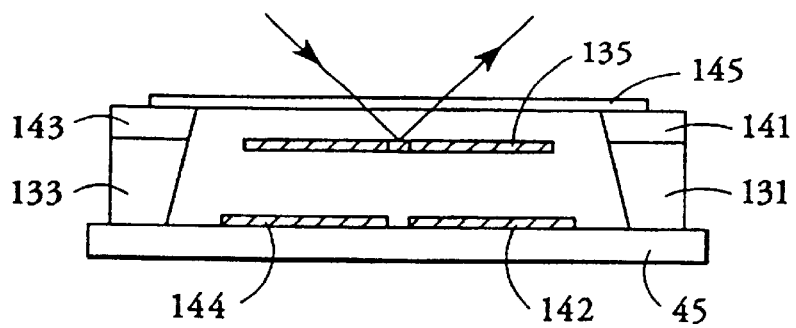
FIGS. 2a, 2b, 2c and 2d are side plan views of alternative micro scanners in accord with the present invention.

In FIG. 2a, the electrodes 142 and 144, corresponding to electrodes 41 and 43 in FIG. 2, are shown on an insulative substrate 45. The larger wafer section has opposite sides 131 and 133 which are disposed on the glass substrate 45 and have a rectangular shape similar to the section 31 of FIG. 2. The mirror 135 is supported by torsion hinges from the larger silicon section in a position spaced above the electrodes 142 and 144. Above the sides 131 and 133 at the larger silicon frame is a portion of a second wafer having opposed edges 141 and 143. Optionally, the edges 141 and 143 support a vapor deposited very thin membrane window 145 (or any transparent window) if a sealed container is desired.

Figure 2B:
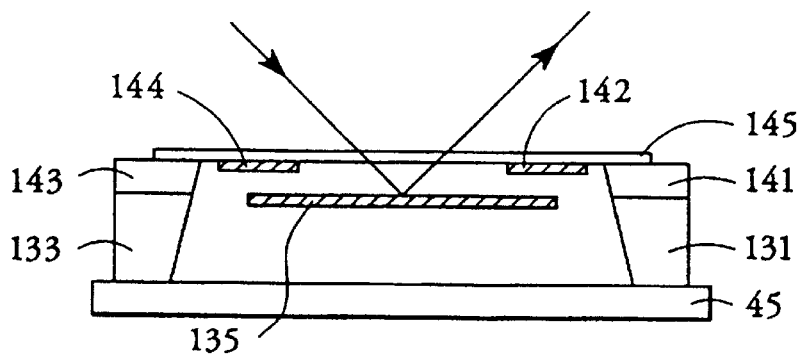

The entire structure is fabricated using semiconductor processing techniques. Atop the dielectric substrate 45, the electrodes 142 and 144 are vapor deposited metal stripes which are patterned on the silicon dioxide coating on the substrate 45 using standard photolithographic techniques. The silicon section having sides 131 and 133 and the integral mirror 135 are separately fabricated by anisotropically etching a silicon wafer. Only opposed torsion hinges support mirror 135. The micromachined silicon housing described above is preferred, but not necessary. A conventional box with a transparent top could also be used. When a membrane window is used, the window is made sufficiently tough so that transparent--electrodes may be deposited directly on the membrane. With reference to FIG. 2b, electrodes 142 and 144 are very thin indium tin oxide stripes deposited on window 145. The stripes may be only a few molecular layers in thickness because very little current is conducted by the electrodes.

The thickness of the mirror 12, 33 or 135 may be equal to the thickness of the wafer, or less. For high frequencies of operation, the mirror thickness is typically a fraction of the wafer thickness. Mirror thickness may range from less than one micron to tens of microns. The preferred method of manufacture, involves use of a Simox wafer, or similar wafers, e.g. silicon on insulator substrates, where the mirror thickness is determined by an epitaxial layer. Single crystal silicon is preferred both for the mirror and the torsion hinges because of its superior strength and fatigue characteristics, as compared to metals or polysilicon. For low frequencies of scanner operation, typically below 100 Hz, if the mirror's thickness equals only that of the epitaxial layer, then the length of the torsion hinges makes them too fragile to withstand liquid processing or shock within their working environments. The full thickness of the wafer's epitaxial layer should be used to form the torsion hinges in this situation. The torsion hinges would now be much broader and shorter, but their thickness would still be set by the epitaxial layer's thickness. However, the mirror would be much thicker equaling the total wafer thickness depicted in FIG. 3a. The wafer about the mirror's mass around the center can be mostly etched away producing a box frame structure such as that illustrated for the frame 207 depicted in FIGS. 12a and 12b. This affects the resonance frequency very little, as well as the moment of inertia, but reduces the mass of the mirror and hence the forces on the torsion hinges. Construction of the thicker section is explained below with reference to FIG. 3a.

Once completed, the larger structure has a light transmissive window mounted above the scanning mirror. This is done by taking a second silicon wafer and vapor depositing a layer of silicon nitride, silicon carbide or boron nitride over the wafer and then etching away the supporting wafer down to the thin vapor deposited film. A thin layer of Si could also be used. The edges 141 and 143 are sides of a second wafer structure joined to opposing edges 131 and 133 of the larger section of a first wafer structure. The two congruent wafer sections are joined by a variety of processes such as anodic bonding, silicon to silicon bonding, solder glasses, etc. all done in a vacuum environment. This creates vacuum conditions inside of a closed container. The method of manufacturing the thin window 145 is described in U.S. Pat. No. 4,468,282 to A. Neukermans. The patent describes thin films having a thickness in the range of a few microns. The area of the window for a micro scanner would be about 3 mm×3 mm. The advantage of such thin films is that optical aberrations are eliminated. The film which is selected should be substantially transmissive of light, with little absorption so that the film will not be damaged by an incident laser beam. By providing a vacuum container for mirror 135, damping due to air is eliminated and the mirror will oscillate to frequencies ranging up to several tens of thousand hertz. It should be noted that a vacuum enclosure is not necessary, but greatly helps in reducing the voltage needed for electrostatic drive, as well as for magnetic drive. Because the micromachined mirrors are difficult to clean, a dust cover is preferable. The windows, in a non-vacuum environment, serve as a dust cover. Large electrostatic voltages attract particles to the surface of the mirror and so the enclosure serves several purposes.

Figure 2C:
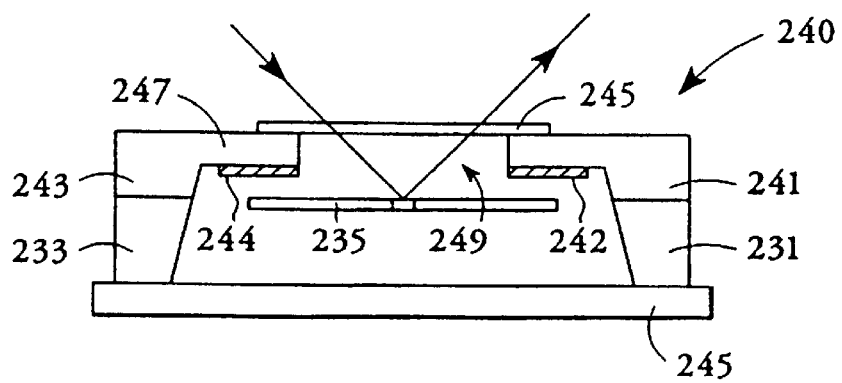

The mirror construction of FIG. 2c is similar to the construction of FIG. 2a. In this case, the insulative substrate 245 supports the larger wafer section having side walls 231 and 233. The smaller wafer section 235 is supported by torsion hinges within a frame defined by the larger wafer section, as in FIG. 2. A second wafer 240 has a vapor deposited thin film window 245 thereover which is similar in materials and construction to the thin film window 145 in FIG. 2a. The second wafer 240 has side walls 241 and 243 and a bottom wall 247 with an etched opening 249 below the film 245. The bottom wall portion 247 overhangs mirror 235 and has electrode stripes 242 and 244 on the underside of the bottom wall 247 facing mirror 235. Just as previously mentioned, the electrode stripes 242 and 244 are conductive material that is vapor deposited once the bottom wall 247 has been formed by etching the second wafer and an oxide coating applied. The electrode stripes 242 and 244 perform the same function as previously, deflecting mirror 235 by electrostatic force generated by alternate high voltages applied to the electrodes. Because of the overhang of bottom wall 247 over the mirror 235, the opening 249 will not be as large as the opening provided in FIG. 2a where the mirror drive force is from the rear of the mirror. It is possible for auxiliary stripes, not shown, to be placed below the mirror in FIGS. 2a and 2b so that electrodes are both above and below the mirror. Drive forces are synchronized between top and bottom electrodes so that diagonally spaced electrodes are both pulling. This symmetric pull relationship between electrodes above and below the mirror will strengthen the vibratory force applied to the mirror and will assist in principal mode selection because of the symmetry.

Figure 2D:
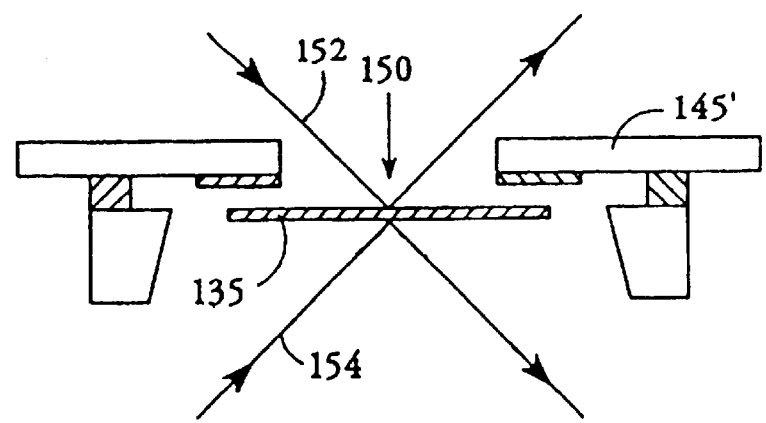

In FIG. 2d mirror 135 is made reflective on both sides. The thin window 145' has a central opening 150 which admits a beam 152 directed toward the center of vibration of the mirror. A similar beam 154 is directed to the back surface of the mirror. In this manner, both front and back surfaces of the mirror can deflect different beams.

Figure 3:
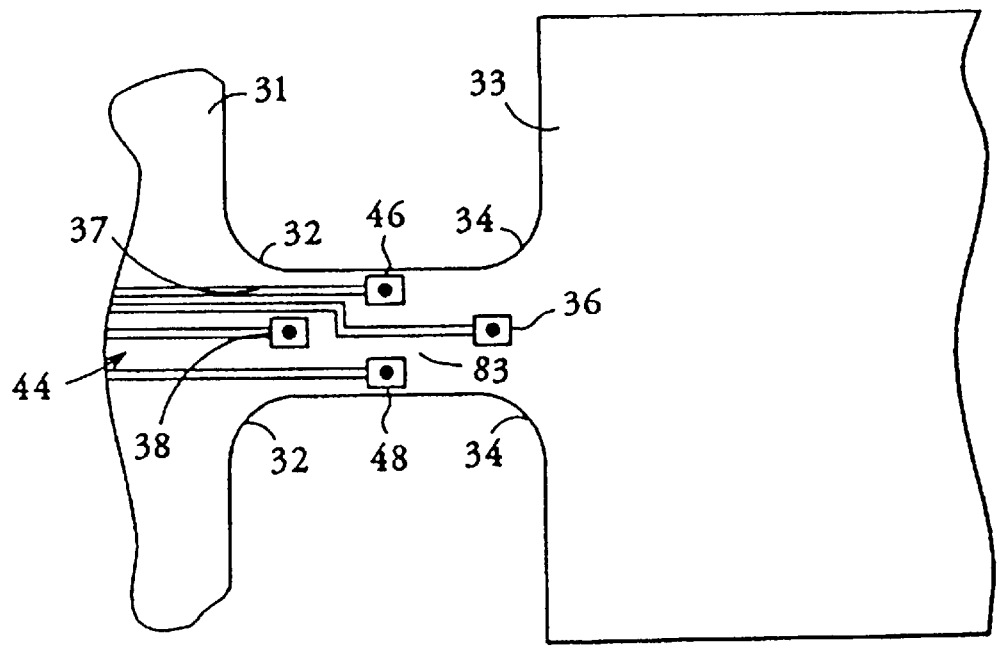
FIG. 3 is a top detail view of a portion of a torsion hinge of a micro scanner in accord with the present invention illustrating the torsion sensor.

In FIG. 3, a detail of torsion hinge 37, suspending mirror 33 from the larger section 31 of a silicon wafer. The torsion hinge 37 may be seen to have rounded corners 32, 34 formed by an anisotropic silicon etch. The rounding of corners removes stress concentrations. The radius of rounding should be at least equal to the thickness of the torsion and preferably it should be near the width of the torsion hinge.

In fabricating torsional scanners in accord with the present invention, commercially available Simox wafers, or similar wafers, e.g. silicon on insulator substrates, are preferred as substrates for construction of the torsional scanners. Epitaxially grown silicon of a different type as its underlying substrate, e.g. germanium-compensated boron-doped silicon, and electrolytic etching of epitaxial layers can also be used. What is required is a layer of high quality, stress free silicon separated from the bulk by a suitable etch stop. With such wafers, the silicon left standing after etching, is single crystal and stress free. The silicon does not curl, which is extremely important for mirror applications. Three well-controlled thicknesses of the mirror plate and torsion hinges are obtained, giving well-controlled results over the entire wafer. Simox wafers have a built-in etch stop which greatly eases fabrication of mirror and torsion hinges. Thick uniform mirror plates and torsion hinges are made in this way, with thicknesses up to 100 microns.

Figure 3A:
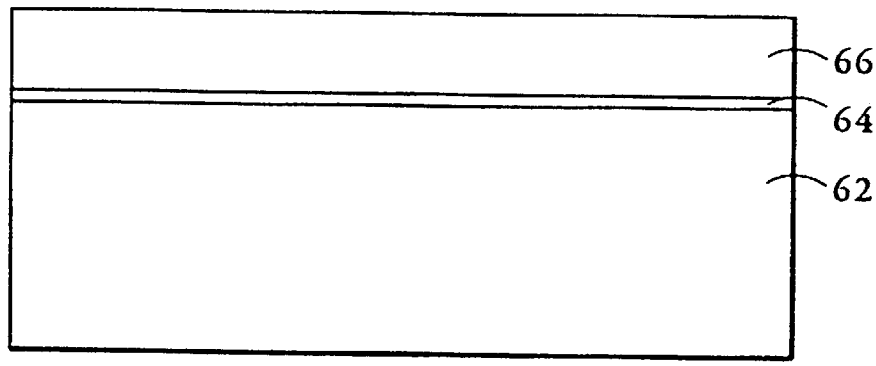
FIGS. 3a and 3b are side plan views of a method of making a micro scanner in accord with the present invention.

FIG. 3a illustrates a Simox wafer. The top epitaxial layer 66 is a few to 50 microns thick, the silicon dioxide layer 64 is about 2,000 Å thick and the base layer 62 is typically a 500 micron layer of single crystal silicon. A cavity is etched from the backside of the wafer, using standard and anisotropic etchants, such as EDP. The oxide layer 64 of Simox or similar substrates provides for a very good, well controlled and clean etch stop. Subsequently, the epitaxial layer 66 of the wafer is patterned to define a mirror 70 and torsion hinges 74. The oxide layer 64 is removed in the desired places and the exposed patterned silicon is etched in a reactive ion etch reactor, using, for example, chlorine or fluorine as an etchant. This now delineates in the epitaxial layer 66 the mirror 70 and torsion hinges 74 and produces straight walled torsion hinges 74. An anisotropic etchant could also be used, producing a trapezoidal cross-section for the torsion hinges 74. After removal of all oxides, the mirror is free standing and optically flat, and can be coated with thin layers of metal or dielectric to enhance reflectivity. As those skilled in the art will recognize, the silicon dioxide layer 64 applies stress to the immediately adjacent layers such as the epitaxial layer 66. It has been observed that during fabrication stress from a thick silicon dioxide layer 64, e.g. a few microns thick, may fracture the mirror 70.

Figure 3B:
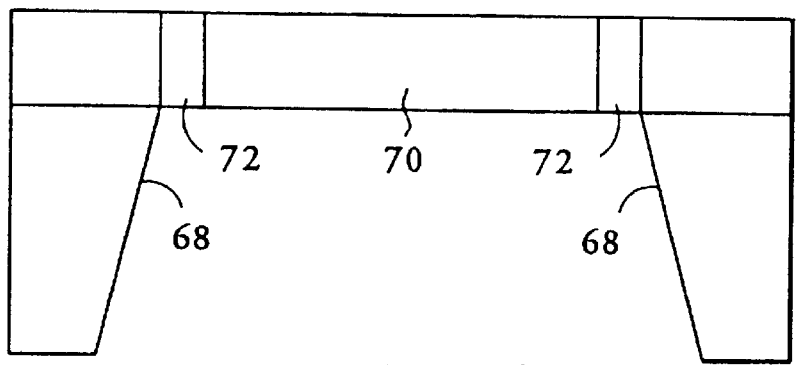
Figure 3C:
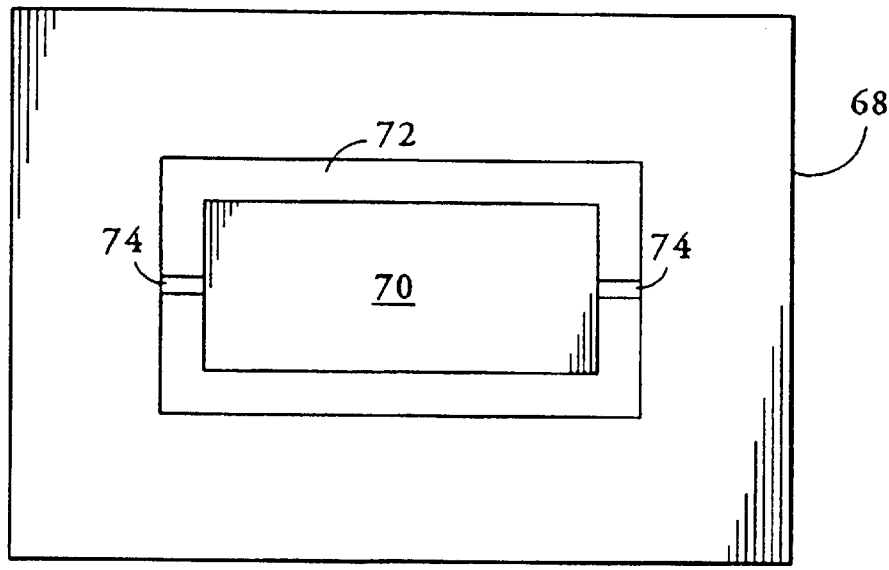
FIG. 3c is a top plan view of the micro scanner shown in FIG. 3b.

Note that in FIG. 3b, the cuts 72 in the epitaxial layer 66 are made concurrently with definition of the mirror 70 and the torsion hinges 74 which support the mirror within the supporting silicon wafer portion 68. Since the epi deposition gives rise to a uniform thickness layer, the thickness of the torsion hinges, determined by the thickness of the epi, are very uniform in size all over the wafer. This property gives rise to a very uniform torsion hinge thickness, which is critical to obtaining a uniform resonance frequency for all the devices on the wafer.

To form the torsion hinges, the frontside of the wafer is patterned. The front mask is aligned to the backside of the wafer, with a two-sided aligner. Oxide layer 64 is removed after patterning and the exposed silicon is etched in a reactive ion etch reactor, using chlorine or fluorine as an etchant. This procedure gives rise to a straight walled torsion hinge 74. Alternatively, the cuts 72 and the torsion hinges 74 may be etched using anisotropic etchants such as KOH or ED, or isotropic etchants such as $HF/HNO_3/H_2O$. Oxide is again removed, leaving free standing torsion hinges supporting the mirror.

An alternate etch stop technique is the well-known electro-chemical etch stop. Epitaxially grown silicon, of a different type as its underlying substrate can also be used together with electrolytic etching. For example, an n-type layer is epitaxially grown on a p-type substrate. By applying a voltage to the n-layer during the etch, it is possible to etch the p-type substrate without etching the n-layer (see ref.). This method can be used to make n-type membranes of precisely determined thickness, which can then be patterned and etched to form mirrors.

As an alternative to an etch stop layer, a plain silicon substrate can be time etched to form membranes of the desired thickness, which can then be patterned and etched to form mirrors.

In achieving maximum deflection, breakage of the torsion hinges is a risk. However, since cracks usually originate and propagate from the surface, the surface can be hardened by conversion of the surface into silicon carbide or silicon nitride. This is done by exposing the surface of the bars to hydrocarbons or ammonia for nitridation at 900° C. This causes the top several thousand angstroms of silicon to be converted into silicon carbide or silicon nitride. See also the method of J. Graul and E. Wagner, Applied Physics Letters, 21, No. 2, p. 67 (1972) relating to conversion of monocrystalline silicon to polycrystalline β-silicon carbide using methane. The scanner mirror must be protected with oxide during the silicon hardening process. The tensile strength of silicon carbide is approximately three times that of silicon.

Referring again to FIG. 3, before the etching of the mirror and torsion hinges, a first pair of contact pads 36 and 38 are aligned along the axis of the torsion hinge. A second pair of contact pads 46 and 48 are transverse to the first pair. Each of the contact pads has a respective wire lead 44 deposited on the torsion hinge leading outwardly to the larger section of wafer material and to electrical connection with the circuitry described herein. Contact pads 36 and 38 are provided for the purpose of establishing a current flow generally coaxial with the torsion hinge axis and between the contact pads 46 and 48. Actually, only one pad 36 could be used as a current injection point and the two nearest pads used as current sinks. Torsion in the bar then causes the ratio of the currents to change. Upon twisting of the torsion hinge, a voltage is generated between pads 46 and 48. The mutually orthogonal contact pads 36, 38 and 46, 48 may be used in two ways. In one mode, the torsion sensor 83 is used for self-oscillation of the resonant structure. The generated voltage is used in a positive feedback scheme, by reinforcing this signal with force members which apply electrostatic or electromagnetic forces to the mirror, making the mirror resonate at its principal torsional frequency. In a second mode, the transverse voltage generated by the twisting mirror is a transducer, measuring angular deflection of the mirror, and so the signal may serve to indicate the angle at which a beam is being deflected.

In the situation where a DC voltage is applied across pads 36 and 38, slight movements of the torsion hinge are converted to vibrations at the resonant frequency of the torsion hinge. In this sense, the electrical sensor is a feedback mechanism which helps the mirror attain resonance at the principal vibrational frequency. If an AC current is applied to the sensor, say 20 kHz, then the torsion signal becomes a modulation envelope of the imposed frequency. The benefit of the modulation envelope is that it is easier to detect and thus monitor vibrational modes, beam position or the like in the presence of large drive signals. The torsion hinge is preferably aligned in the <110> direction for n-type silicon or the <100> direction for p-type silicon. These orientations are not only optimal for shear stress, but these arrangements are nearly insensitive to uniaxial strains in these orientations.

The preferred torsion sensor 83 is of the four terminal type illustrated in FIG. 3 and similar to the type described by Pfann et al., but optimized here for a hinge. See "Semiconducting Stress Transducers Utilizing the Transverse and Shear Piezo Resistance Effects", W. G. Pfann and R. N. Thurston, Journ. Appl. Phys., Vol. 32, 10, pg. 2008, 1961. Preferably, current passes through terminals 46 and 48 perpendicular to the flexure hinge length, and the output voltage is measured between terminals 36 and 38.

Torsion of the hinge gives rise to a change in the voltage between points 36 and 38. For torsion of the hinge, the stresses present are pure shear stresses, oriented parallel to the indicated current direction. The field generated in the perpendicular direction is given by the expression:

$$E = i 92 \, \sigma \pi$$

where E is the field, ρ the nominal resistivity of the material, i the current density, σ the shear stress, and π the relevant element of the piezoresistive tensor in the particular direction.

By orienting the sensor as illustrated, with the current perpendicular to the length of the hinge, the current section can be made as long as is desirable.

An alternative orientation for the torsion sensor 83 exists in which current flows parallel to the hinge length from 36 to 38, and the voltage is picked up perpendicular to the hinge length between terminals 46 and 48. The field generated is given by the same expression, but the current width is now restricted to the width of the hinge. The only way to increase the voltage for the alternative orientation is to increase the voltage applied at the current leads 36 and 38. Note also that the first orientation of the torsion sensor is also advantageous for another reason: the current supply lines are usually quite broad. If current flows through the torsion sensor 83 as described for the alternative embodiment the current supply lines leave little room to bring out the voltage sensing lines. If the hinge is under considerable shear stress, then it is advantageous to put the current carrying lines at the edge of the hinge, where the shear stress is zero, as this reduces metal fatigue.

Silicon, in the right orientation, is extremely sensitive to shear, more so than to any other stress. For a (100) orientation of the Si wafer surface, which is the preferred orientation for most micromachining, the highest shear sensitivities are obtained with the torsion hinge in the (100) direction for p-type silicon, and in the (110) direction for n-type silicon. Note that the output of this torsion sensor is almost independent of any linear stresses or bending of the hinge.

The described piezo voltage is a bulk effect; however in many hinges of interest, the thickness of the hinge is much less than the width of the hinge. Since the shear stress reverses sign on the other face of the hinge, the generated voltages also reverse sign. The effects would then tend to cancel each other if the current were uniform throughout the thickness of the hinge. Therefore the applied current must be restricted to one half of the hinge, where the shear stress has always the same sign. In practice it is best to restrict the current to the top few microns of the hinge, as the stress is largest there, and to reduce the power dissipation. This can be done by preferentially heavy doping of the top few microns (n-type in n-type material), or by junction isolation (e.g., making an n-type well in a p-type substrate). The latter technique has the advantage that the sensor is electrically no longer part of the hinge and the associated structures, but is now junction isolated and therefore much less sensitive to the driving voltage pickup.

Figure 4:
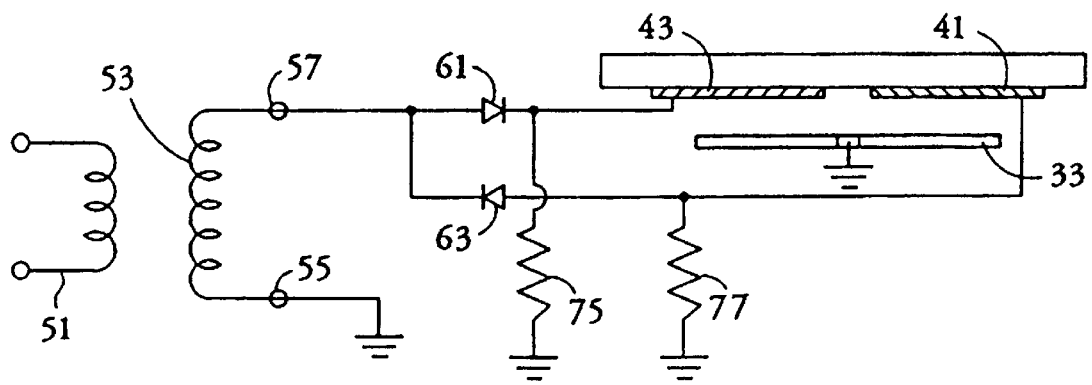
FIG. 4 is an electrical schematic of an electrical circuit for driving the electrodes of the micro scanner of FIG. 2.
Figure 4A:
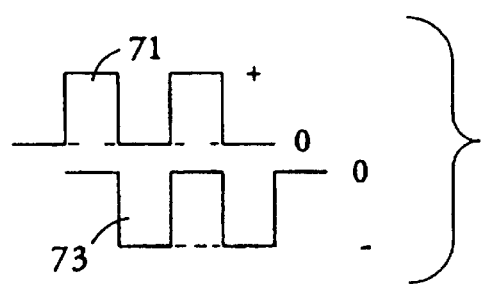
FIG. 4a is a waveform diagram for rectified current to the stripe electrodes in FIG. 4.

In FIGS. 4 and 4a, an electrical circuit is shown which provides the drive signal for the stripe electrodes 41 and 43 in FIG. 2. A sinusoidal or square wave low voltage input signal is applied to transformer primary winding 51. The secondary winding 53 of a ferrite core transformer steps up the input voltage to a higher level at a 50 to 1 turns ratio. A commercially available part such as Phillips 36222 PL00-3E2A will suffice. The secondary winding 53 has a grounded side 55 and a hot side 57 which is rectified by one or more diodes 61 in a first leg and one or more reversed biased diodes 63 in a second leg. The diode string 61 of the first leg provide a rectified half wave 71 to electrode 43. The reversed biased diode string 63 provides a rectified half wave 73 to electrode 41 at peak voltages as high as 1000 volts. High value bleed-off resistors 75 and 77, about 10M ohms, are used to discharge the plates. These voltages which are seen in FIG. 4a to alternate from positive to negative corresponding to one electrode then the other, pulling from one side then the other, causing mirror reciprocation.

Figure 5A:
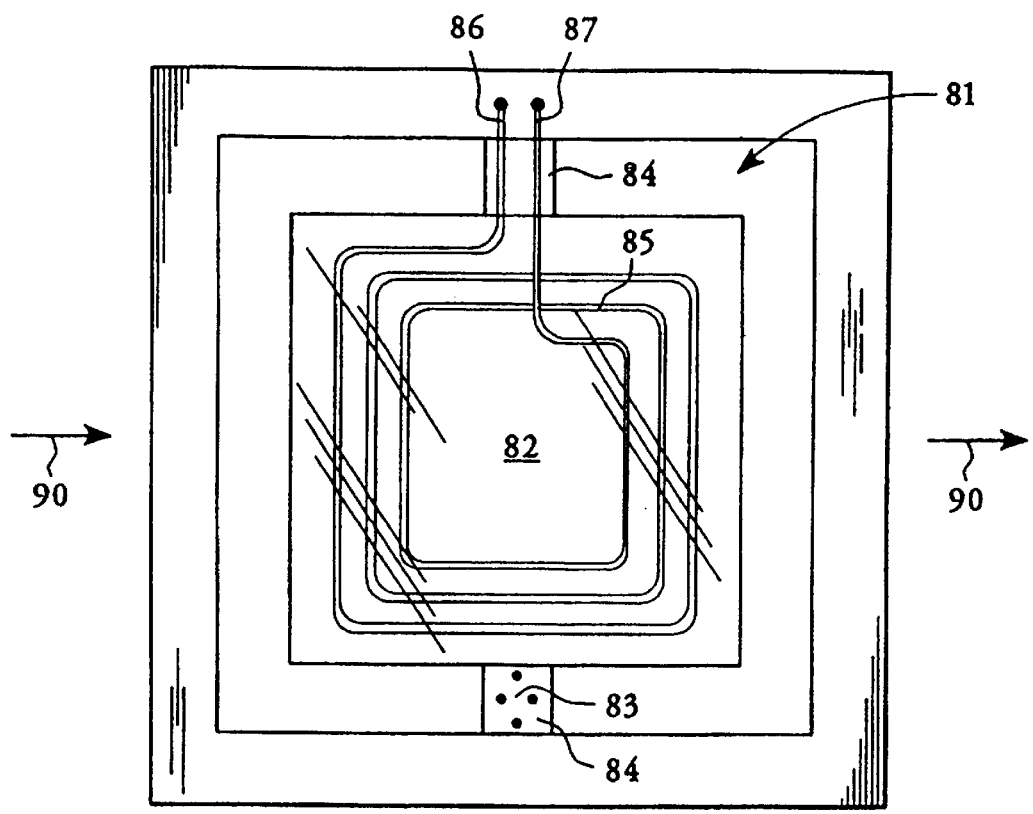
FIG. 5a is a top plan view and FIG. 5b is a side plan view of a micro scanner of the present invention with a galvanometer coil drive apparatus.
Figure 5B:
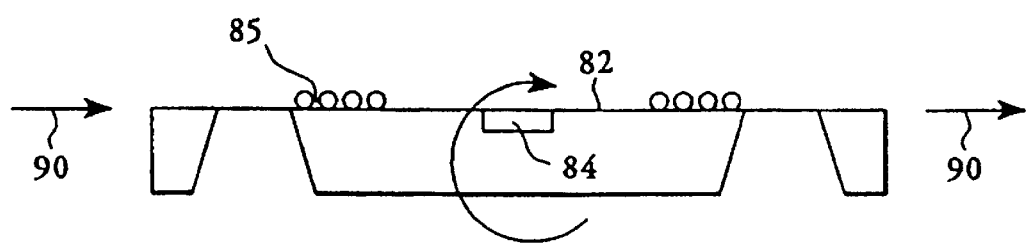

With reference to FIGS. 5a and 5b a torsional scanner 81 is shown having a central mirror 82, torsion hinges 84, contact pads 83 to be used as a position sensor in accord with the description given in relation to FIG. 3, and a circumferential loop coil 85. The coil 85 is a conductive loop which may be formed by patterning or vapor depositing conductive material onto the silicon mirror 82 about the periphery thereof. The object is to establish a magnetic field within the coil perpendicular to the mirror. The coil or loop is insulated with silicon dioxide or another insulator. The conductive crossover of conductor 87 is accomplished by well known layering techniques. Alternatively, conductor 87 can be terminated prior to the crossover location and, if the underlying silicon is sufficiently conductive, may be used as a ground return path. Current is brought into the coil by means of a conductor 86 on torsion hinge 84 and current is removed by conductor 87. An external magnetic field is applied parallel to the plane of mirror 82, as indicated by arrows 90. The magnetic field applies a moment to the mirror when current flows in the coil 85 tending to turn the mirror out of its starting plane. This force is balanced by torsion in the torsion hinges and is measured by an angle transducer associated with the contacts 83. The coil 85 thus behaves like a galvanometer coil, with greater amounts of current causing greater amounts of deflection. Before the limit is reached, current may be reversed and the mirror will rotate in the opposite direction. In this manner, a miniature scanning mirror, driven by magnetic forces may be built. The signal from the torsion sensor 83 can be used, in the feedback loop, to provide any desired scan profile, such as a linear or sinusoidal scan. Electrostatic forces can also be used in the feedback scheme, but are more prone to instabilities. Also, the magnetic driver described above may be combined with the electrostatic driver previously described.

Figure 6:
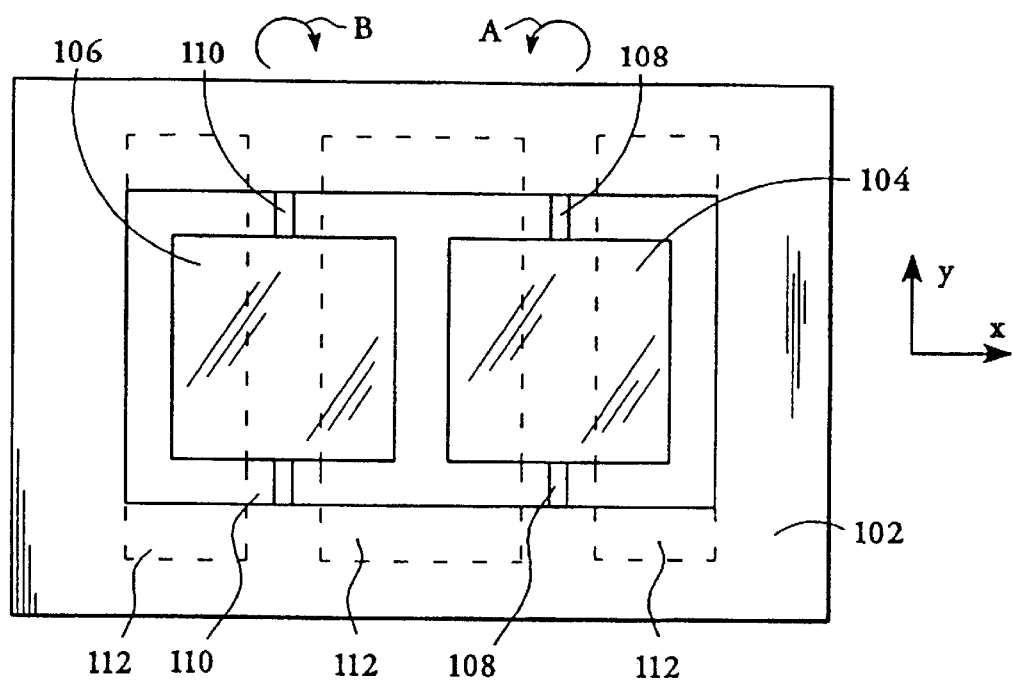
FIGS. 6 and 7 are top plan views of two different embodiments of dual mirror scanners in accord with the present invention.

FIG. 6 shows that a single silicon frame 102 may support a pair of micro scanners 104 and 106, each supported by a pair of torsion hinges 108 and 110, respectively. Stripe electrodes 112 beneath the two mirrors provide torques in opposed phases so that the mirrors reciprocate as indicated by the arrows A and B, i.e. oppositely. By applying opposite torques to the two mirrors, the torques transferred to the larger silicon section 102 cancel each other, thereby lessening vibration which must be absorbed by the larger section.

Figure 7:
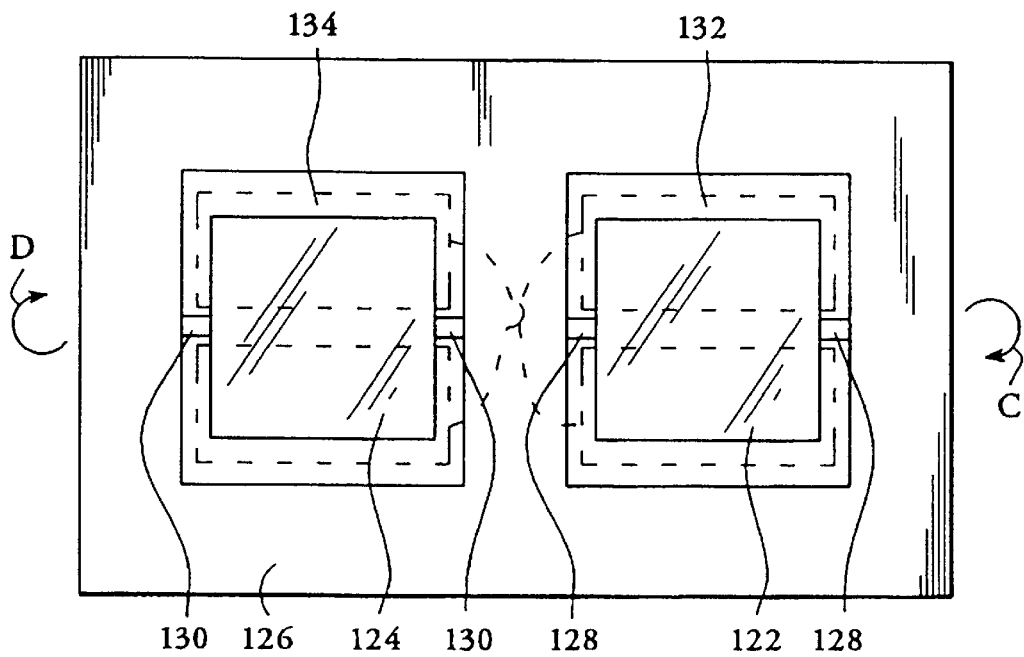

In FIG. 7, a pair of mirrors 122 and 124 are supported within the larger silicon section 126. The mirrors are supported in a closely spaced relationship by torsion hinges 128 and 130 with driver stripes 132 and 134, indicated by dashed lines, below the respective mirrors. The plates drive the mirrors in an out-of-phase manner, as in FIG. 6, indicated by the arrows C and D. Once again, the out-of-phase relationship of the two mirrors removes vibration in the larger frame 126 by nulling opposing torques. Since the mirror resonators are close together, as defined by a lithographic process, they are likely to be nearly identical in resonance characteristics, and their amplitudes (and Q) are expected to be nearly identical. To further tune and equalize the resonance frequencies, laser trimming can be used either to remove deposited metal on the silicon surface, or from the torsion hinge, or part of the silicon section itself. Hence, almost complete cancellation of the torques takes place. With this arrangement, mirrors with resonant frequency differences as small as one part in 1,000 have been made and torques have been cancelled to within a few percent, without any laser trimming of the mirrors. It should be noted that when this arrangement is used in a x-y drive, then the arrangement of FIG. 6 is preferred. This arrangement allows for larger angles around the x-axis because the extent of the mirror arrangement is smaller in the y direction. Any combination of oscillating plates can be used, so long as the total torques cancel.

Figure 8:
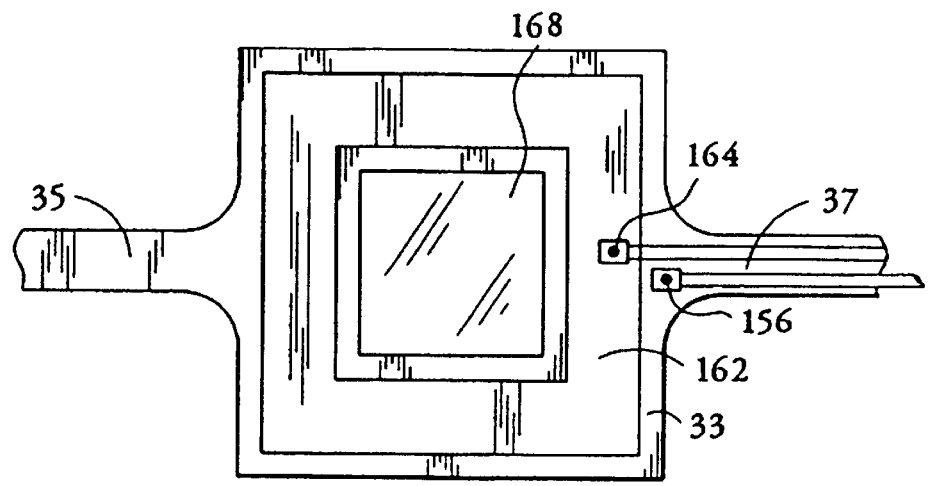
FIG. 8 is a top view of a combined micro scanner and aligned photodetector in accord with the present invention.

In FIG. 8, an integrated mirror and photodiode arrangement is shown. The central mirror region 168 formed of silicon, possibly metal coated, is surrounded by a photodiode array 162. For example, if the silicon is n-type, a p implant can be made in this region and p$^+$ contact 164 is used to make contact to the diode. N+ contact 156 is the other lead of the diode. Standard guard regions isolate the photodiode array from the central mirror region 168 and edge of the mirror plate. Other types of photodiodes, such as pin, Schottkey, Avalanche or the like may be used, rather than the diodes described herein. The advantage of the structure of FIG. 8 is that as the central mirror region 168 oscillates, the photodetector region 162 moves with it at the same angle so that the same relationship between beam and detector position is always maintained.

Figure 9:
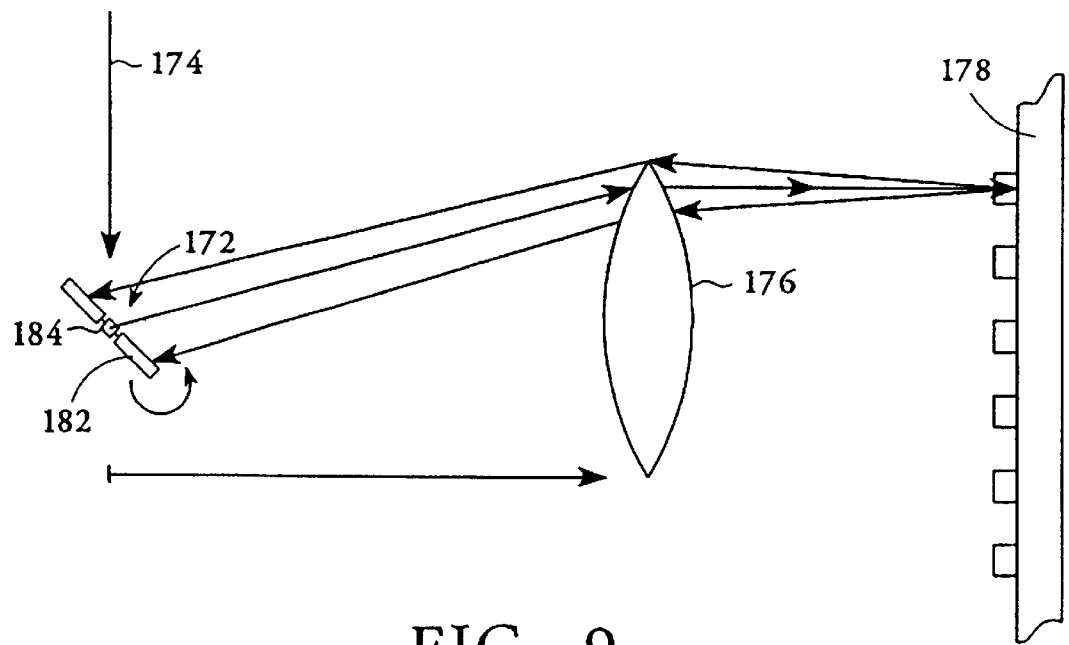
FIG. 9 is a plan view of the combined arrangement shown in FIG. 8 used in an optical scanning system.

In FIG. 9, an integrated mirror and detector arrangement 172 of the type described in FIGS. 8a and 8b is shown deflecting a beam 174 toward an f-Θ lens 176 which provides a telecentric scan over an object 178. Reflected and forward scattered light will follow the same trajectory as incident light and be detected on the peripheral detector 182 surrounding the central mirror 184. This arrangement saves several optical components which are normally associated with a separate detector.

Figure 10:
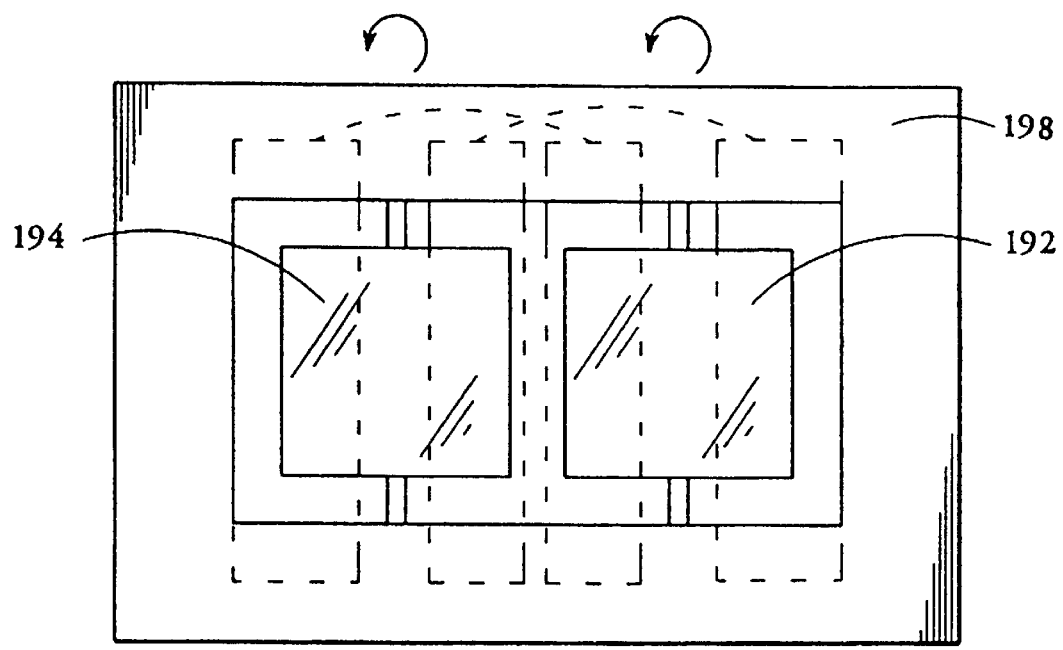
FIG. 10 is a top view of a dual in-phase micro scanner and photodetector combination in an optical scanning system.

FIG. 10 shows a tandem arrangement 198 of a micro scanner mirror 192 and a direct detector array 194, both supported in a manner previously described with reference to FIG. 6. In FIG. 10, the micro scanner mirror 192 and detector array 194 are driven in-phase, simultaneously facing in the same direction. Detectors in the detector array 194 are formed in a manner described with reference to FIG. 8 with the silicon section doped with a dopant of a first conductivity type and island implants of ions of a second conductivity type forming p-n junctions. Contact is made with the two regions where p-n junctions are formed so that photoconductive currents may be sensed.

Figure 11:
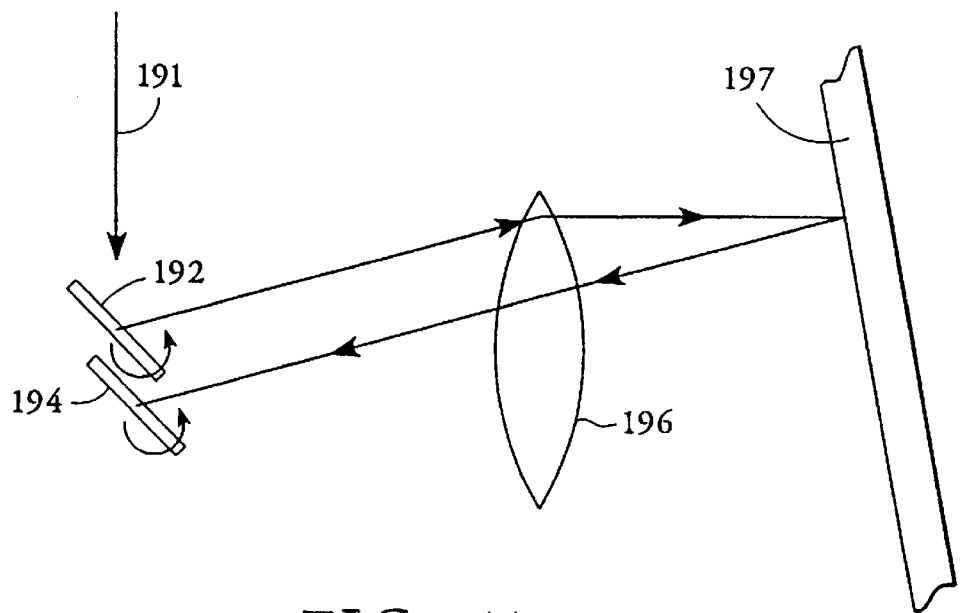
FIG. 11 is a plan view of the combined arrangement shown in FIG. 10 used in an optical scanning system.

The arrangement of a scanner detector combination is shown in FIG. 11 where the micro scanner mirror 192 deflects a beam 191 through a lens 196 to a tilted object 197 to be scanned. The reflected beam from object 197 impinges upon detector 194 which faces the same angle as the micro scanner mirror 192.

Figure 12A:
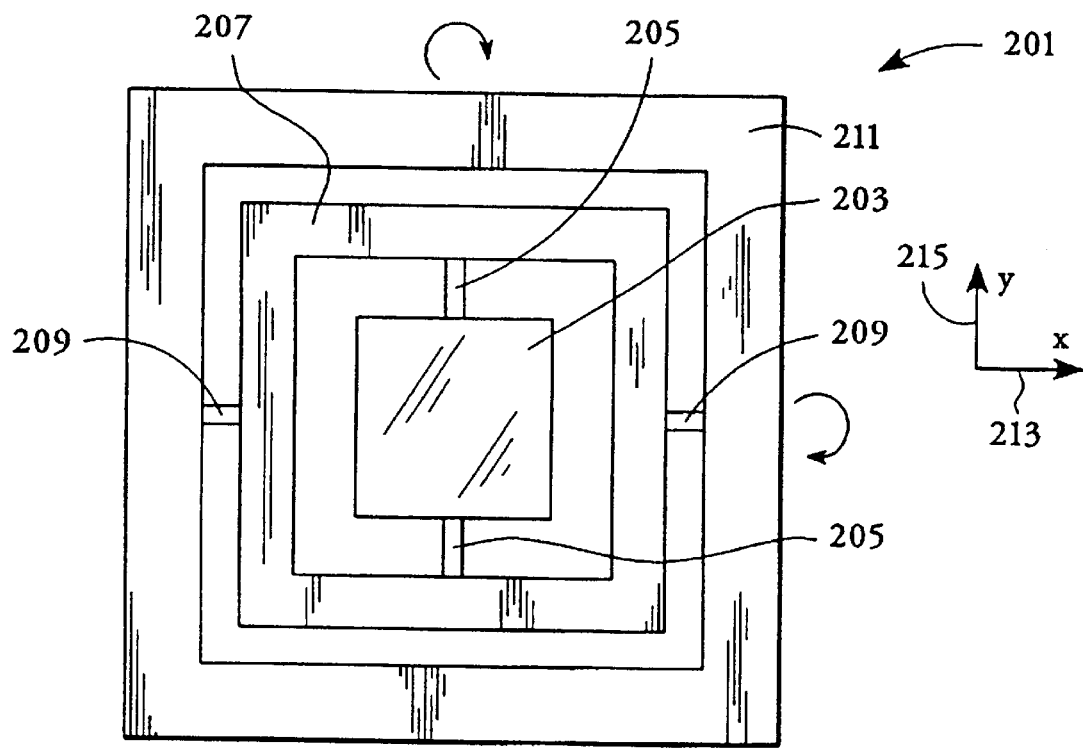
FIGS. 12a and 12b show respective top and side views of a two-dimensional micro scanner in accord with the present invention.
Figure 12B:
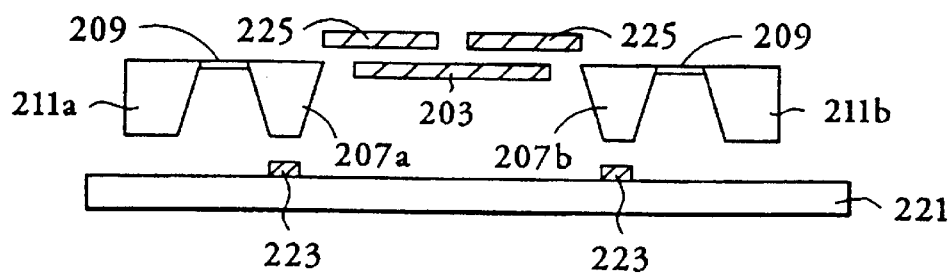

In FIGS. 12a and 12b the two-dimensional scanner 201 has a central mirror 203 supported by torsion hinges 205 from a first rectangular frame 207. The rectangular frame 207 is supported by torsion hinges 209 from a larger silicon section 211. In one implementation, each set of torsion hinges carries the torsion sensor 83 shown in FIG. 3. The mirror 203 and the surrounding silicon frame 207 have independent driver electrodes so that the mirror 203 can be driven at one rate while the frame 207 may be driven at a second rate. This allows raster scanning in x and y directions as indicated by arrows 213 and 215, respectively. Mirror 203 causes scanning in the x direction, indicated by arrow 213, typically at a high rate, such as the horizontal scan rate used in television. The surrounding frame 207 scans at a slower rate in the y direction indicated by arrow 215. For example, the rate may be the vertical television scan rate. It is important to compensate the minor mirror for vibration. Rotation of the axis of-minor mirror causes coriolis forces on plate 207 transmitted to torsion hinges 209. Compensation with two plates, rotating in opposition, removes this effect. Plate 203 can either be a mirror, or diode array and mirror, as above. Actuating drives can be either magnetic, electrostatic, or like. Torsion sensors 83 can also be used to scan the x-y plate at any fixed particular angle, in x or y directions, or fixed in the x-y plane and oscillating in another axis. The two-dimensional scanner of FIG. 12b could be used to deflect a laser beam onto a diffuse or phosphorescent screen. If the laser were modulated with television receiver images, a very compact substitute for a cathode ray tube is available. The two-dimensional scanner would preferably be enclosed in a vacuum housing, as earlier described, to eliminate air damping of the high frequency mirror 203. X and Y scan frequencies are usually separated by at least an order of magnitude. The outer scanner typically has a greater mass than the inner scanner, with stiffer torsion hinges. This requires a higher voltage for driving the outer torsion hinges but makes them less likely to respond to the driving frequency of the torsion hinges of the inner scanner. Although the mass of the outer scanner is greater than the inner scanner, the mass should be as low as possible but with a large moment of inertia around the axis of rotation. A hollow frame provides such a large moment with low mass.

FIG. 12b shows the construction of the two-dimensional scanner. An insulative substrate 221 is coated with a pair of stripe electrodes 223 which are slightly spaced from the first silicon frame member side walls 207a and 207b. The inner silicon frame is spaced from the outer silicon section by the torsion hinges 209 connecting with side wall members 211a and 211b. The inner mirror 203 is supported from the same silicon member as the frame 207 and the outer section 211 but is thinned in the manner previously described in order to achieve low mass. Driver electrodes 225 are supported from overhang regions in the manner described with reference to FIG. 2b. The overhang regions and thin film window associated with a container for the apparatus are not shown. Building of torsion sensors, diode leads, magnetic coils and the like requires a fairly large number of leads going over the torsion hinges. It is possible to sense the resonance condition of mirror 203 on torsion hinge 209; oscillation of mirror 203 causes uniaxial stresses in torsion hinge 209, which can be sensed with the usual uniaxial piezo sensors built into torsion hinge 209. This arrangement requires fewer leads.

In vacuum, because of the absence of viscous damping, the Q of the device becomes extremely high. Q's close to 700,000 have been measured in a vacuum of $2 \times 10^{-6}$, for a device which had a Q of 20 at atmospheric pressure at 810 Hz. A few volts is then all that is required to power the device with an electrostatic drive. This low voltage makes shielding of other peripheral devices, such as the electronics circuits for the torsion sensor or photodiode array much easier to accomplish. The Q (or the damping) of the resonator can be readily adjusted by changing the ambient pressure in which the device operates. Because the required power for oscillation is so low, one can envision a solar cell on the same piece of silicon, providing power required for the torsional oscillator. Such a power supply could also power a laser diode of a scanner for short periods of time. In this manner, the scanner of the present invention would not require any external power supply.

The micromachined scanner of the present invention is so light that it can be carried by a conventional scanner in a second, usually orthogonal axis, without any problem. Thus, a conventional scanner would provide scanning motion in one axis, say x-axis, while the scanner of the present invention would provide scanning in an orthogonal axis, say y-axis. The conventional scanner, which might be a galvanometer scanner, would operate at a lower frequency and the micromachined scanner of the present invention, which would contain the scan center, would operate at a higher frequency.

Using two dimensional scanning, together with a modulated diode laser, it is possible to make simple and inexpensive displays. For example, a very high frequency scanner can be made, by operating the micro scanner in vacuum. For example, using a 10 micron thick mirror, 800 micron square, with torsion hinges 20 microns wide and 200 microns long, the resonance is on the order of 15,000 Hz. This is about equal to the horizontal sweep frequency of a television display (15,750 Hz). Hence, a mechanical scanner, oscillating at 60 Hz (driven by the line frequency) carries the very fast scanner in the other direction. Together they present a very inexpensive system capable of displaying television images on a phosphor screen with a 2:1 interlace. If the resonance frequency of the lower scanner is higher (say 120 Hz) for ease of operation, then a 4:1 interlacing scheme needs to be used to obtain 30 frames a second. No electron beam is used. The x and y drives are preferably linear, rather than sinusoidal drives, using a magnetic drive and the torsion sensor. Four terminal piezosensors have been suggested as angle sensors for self-oscillation. Capacitive sensors have been used for self-oscillation, (R. N. Kleiman et al., Rev.Sci.Instrum., vol. 56, 11, 1985), because they are less expensive. When the oscillator is enclosed in a vacuum box, capacitive sensors may be preferred, because no leads need to go through the vacuum package. Well known micromachining techniques exist for providing corrugations around the mirror periphery. This enhances mirror flatness greatly, while affecting the mass very little.

Although the present invention has been described in terms of the presently preferred embodiment, it is to be understood that such disclosure is purely illustrative and is not to be interpreted as limiting. For example, it is preferable to first etch the cavity from the backside of the wafer before patterning and etching the mirror 70 and torsion hinges 74. However, by suitably protecting the frontside after first forming the patterns for the mirror 70 and torsion hinges 74 therein, it is possible to thereafter etch the cavity from the backside of the wafer. Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. A method for operating an integrated, micromachined structure comprising the steps of:

providing a micromachined structure that is monolithically fabricated from a stress-free semiconductor layer of a silicon substrate, the micromachined structure including:

a reference member;

a first pair of torsion hinges projecting from the reference member; and a first dynamic member that is coupled only by the first pair of torsion hinges to the reference member to be thereby supported from the reference member in a first rest position with respect to the reference member if no external force is applied to the first dynamic member; the first pair of torsion hinges alone also supporting the first dynamic member for rotation about a first axis with respect to the reference member; the first dynamic member as supported only by the first pair of torsion hinges exhibiting a plurality of vibrational modes with respect to the reference member including a principal torsional vibrational mode of rotation about the first axis, a vertical shaking vibrational mode, a vertical rocking vibrational mode, a lateral shaking vibrational mode, and a lateral rocking vibrational mode, each vibrational mode of the first dynamic member having a vibrational frequency; and applying to the first dynamic member a first force that urges the first dynamic member to rotate about the first axis out of the first rest position to a fixed particular angle with respect to the reference member.

2. The method of claim 1 wherein the first dynamic member of the micromachined structure is provided with enhanced reflectivity by a thin layer of metal applied thereto.

3. The method of claim 2 wherein the first force urging the first dynamic member to rotate is applied electrostatically.

4. The method of claim 3 wherein at least one of the torsion hinges of the first pair provided in the micromachined structure includes a torsion sensor for generating a signal that measures angular deflection of the first dynamic member with respect to the reference member; and wherein a feedback loop used in applying the electrostatic first force that urges the first dynamic member to rotate responds to the signal generated by the torsion sensor.

5. The method of claim 3 wherein the micromachined structure provided includes a capacitance sensor for generating a signal that measures angular deflection of the first dynamic member with respect to the reference member; and wherein a feedback loop used in applying the electrostatic first force that urges the first dynamic member to rotate responds to the signal generated by the capacitance sensor.

6. The method of claim 2 wherein the first force urging the first dynamic member to rotate is applied electromagnetically.

7. The method of claim 6 wherein at least one of the torsion hinges of the first pair provided in the micromachined structure includes a torsion sensor for generating a signal that measures angular deflection of the first dynamic member with respect to the reference member; and wherein a feedback loop used in applying the electromagnetic first force that urges the first dynamic member to rotate responds to the signal generated by the torsion sensor.

8. The method of claim 6 wherein the micromachined structure provided includes a capacitance sensor for generating a signal that measures angular deflection of the first dynamic member with respect to the reference member; and wherein a feedback loop used in applying the electromagnetic first force that urges the first dynamic member to rotate responds to the signal generated by the capacitance sensor.

9. The method of claim 1 wherein the first dynamic member of the micromachined structure is provided with enhanced reflectivity by a thin layer of dielectric applied thereto.

10. The method of claim 9 wherein the first force urging the first dynamic member to rotate is applied electrostatically.

11. The method of claim 10 wherein at least one of the torsion hinges of the first pair provided in the micromachined structure includes a torsion sensor for generating a signal that measures angular deflection of the first dynamic member with respect to the reference member; and wherein a feedback loop used in applying the electrostatic first force that urges the first dynamic member to rotate responds to the signal generated by the torsion sensor.

12. The method of claim 10 wherein the micromachined structure provided includes a capacitance sensor for generating a signal that measures angular deflection of the first dynamic member with respect to the reference member; and wherein a feedback loop used in applying the electrostatic first force that urges the first dynamic member to rotate responds to the signal generated by the capacitance sensor.

13. The method of claim 9 wherein the first force urging the first dynamic member to rotate is applied electromagnetically.

14. The method of claim 13 wherein at least one of the torsion hinges of the first pair provided in the micromachined structure includes a torsion sensor for generating a signal that measures angular deflection of the first dynamic member with respect to the reference member; and wherein a feedback loop used in applying the electromagnetic first force that urges the first dynamic member to rotate responds to the signal generated by the torsion sensor.

15. The method of claim 13 wherein the micromachined structure provided includes a capacitance sensor for generating a signal that measures angular deflection of the first dynamic member with respect to the reference member; and wherein a feedback loop used in applying the electromagnetic first force that urges the first dynamic member to rotate responds to the signal generated by the capacitance sensor.

16. The method of claim 1 wherein the first force urging the first dynamic member to rotate is applied electrostatically.

17. The method of claim 16 wherein at least one of the torsion hinges of the first pair provided in the micromachined structure includes a torsion sensor for generating a signal that measures angular deflection of the first dynamic member with respect to the reference member; and wherein a feedback loop used in applying the electrostatic first force that urges the first dynamic member to rotate responds to the signal generated by the torsion sensor.

18. The method of claim 16 wherein the micromachined structure provided includes a capacitance sensor for generating a signal that measures angular deflection of the first dynamic member with respect to the reference member; and wherein a feedback loop used in applying the electrostatic first force that urges the first dynamic member to rotate responds to the signal generated by the capacitance sensor.

19. The method of claim 1 wherein the first force urging the first dynamic member to rotate is applied electromagnetically.

20. The method of claim 19 wherein at least one of the torsion hinges of the first pair provided in the micromachined structure includes a torsion sensor for generating a signal that measures angular deflection of the first dynamic member with respect to the reference member; and wherein a feedback loop used in applying the electromagnetic first force that urges the first dynamic member to rotate responds to the signal generated by the torsion sensor.

21. The method of claim 19 wherein the micromachined structure provided includes a capacitance sensor for generating a signal that measures angular deflection of the first dynamic member with respect to the reference member; and wherein a feedback loop used in applying the electromagnetic first force that urges the first dynamic member to rotate responds to the signal generated by the capacitance sensor.

22. A method for operating an integrated, micromachined structure comprising the steps of:

providing a micromachined structure that is monolithically fabricated from a stress-free semiconductor layer of a silicon substrate, the micromachined structure including:
    a reference member;
    a first pair of torsion hinges projecting from the reference member; and a first dynamic member that is coupled only by the first pair of torsion hinges to the reference member to be thereby supported from the reference member in a first rest position with respect to the reference member if no external force is applied to the first dynamic member; the first pair of torsion hinges alone also supporting the first dynamic member for rotation about a first axis with respect to the reference member; the first dynamic member as supported only by the first pair of torsion hinges exhibiting a plurality of vibrational modes with respect to the reference member including a principal torsional vibrational mode of rotation about the first axis, a vertical shaking vibrational mode, a vertical rocking vibrational mode, a lateral shaking vibrational mode, and a lateral rocking vibrational mode, each vibrational mode of the first dynamic member having a vibrational frequency; the first dynamic member including:
- a frame to which the first pair of torsion hinges couple:
  - a second pair of torsion hinges projecting from the frame, the second pair of torsion hinges being oriented non-parallel to the first pair of torsion hinges; and
  - a second dynamic member that is coupled only by the second pair of torsion hinges to the frame to be thereby supported from the frame in a second rest position with respect to the frame if no external force is applied to the second dynamic member; the second pair of torsion hinges, the frame, and the first pair of torsion hinges alone also supporting the second dynamic member for rotation about a second axis with respect to the frame and about the first axis with respect to the reference member; the second dynamic member as supported only by the second pair of torsion hinges, the frame, and the first pair of torsion hinges exhibiting a plurality of vibrational modes with respect to the frame including a principal torsional vibrational mode of rotation about the second axis, a vertical shaking vibrational mode, a vertical rocking vibrational mode, a lateral shaking vibrational mode, and a lateral rocking vibrational mode, each vibrational mode of the second dynamic member having a vibrational frequency;

applying to the first dynamic member a first force that urges the first dynamic member to rotate about the first axis out of the first rest position to a fixed particular angle with respect to the reference member; and applying to the second dynamic member a second force that urges the second dynamic member to rotate about the second axis out of the second rest position to a fixed particular angle with respect to the frame.

23. The method of claim 22 wherein the second dynamic member of the micromachined structure is provided with enhanced reflectivity by a thin layer of metal applied thereto.

24. The method of claim 23 wherein the first force urging the first dynamic member to rotate is applied electrostatically.

25. The method of claim 24 wherein at least one of the torsion hinges of the first pair provided in the micromachined structure includes a torsion sensor for generating a signal that measures angular deflection of the first dynamic member with respect to the reference member; and wherein a feedback loop used in applying the electrostatic first force that urges the first dynamic member to rotate responds to the signal generated by the torsion sensor.

26. The method of claim 24 wherein the micromachined structure provided includes a capacitance sensor for generating a signal that measures angular deflection of the first dynamic member with respect to the reference member; and wherein a feedback loop used in applying the electrostatic first force that urges the first dynamic member to rotate responds to the signal generated by the capacitance sensor.

27. The method of claim 23 wherein the first force urging the first dynamic member to rotate is applied electromagnetically.

28. The method of claim 27 wherein at least one of the torsion hinges of the first pair provided in the micromachined structure includes a torsion sensor for generating a signal that measures angular deflection of the first dynamic member with respect to the reference member; and wherein a feedback loop used in applying the electromagnetic first force that urges the first dynamic member to rotate responds to the signal generated by the torsion sensor.

29. The method of claim 27 wherein the micromachined structure provided includes a capacitance sensor for generating a signal that measures angular deflection of the first dynamic member with respect to the reference member; and wherein a feedback loop used in applying the electromagnetic first force that urges the first dynamic member to rotate responds to the signal generated by he capacitance sensor.

30. The method of claim 23 wherein the second force urging the second dynamic member to rotate is applied electrostatically.

31. The method of claim 30 wherein at least one of the torsion hinges of the second pair provided in the micromachined structure includes a torsion sensor for generating a signal that measures angular deflection of the second dynamic member with respect to the frame; and wherein a feedback loop used in applying the electrostatic second force that urges the second dynamic member to rotate responds to the signal generated by the torsion sensor.

32. The method of claim 30 wherein the micromachined structure provided includes a capacitance sensor for generating a signal that measures angular deflection of the second dynamic member; and wherein a feedback loop used in applying the electrostatic second force that urges the second dynamic member to rotate responds to the signal generated by the capacitance sensor.

33. The method of claim 23 wherein the second force urging the second dynamic-member to rotate is applied electromagnetically.

34. The method of claim 33 wherein at least one of the torsion hinges of the second pair provided in the micromachined structure includes a torsion sensor for generating a signal that measures angular deflection of the second dynamic member with respect to the frame; and wherein a feedback loop used in applying the electromagnetic second force that urges the second dynamic member to rotate responds to the signal generated by the torsion sensor.

35. The method of claim 33 wherein the micromachined structure provided includes a capacitance sensor for generating a signal that measures angular deflection of the second dynamic member; and wherein a feedback loop used in applying the electromagnetic second force that urges the second dynamic member to rotate responds to the signal generated by the capacitance sensor.

36. The method of claim 22 wherein the second dynamic member of the micromachined structure is provided with enhanced reflectivity by a thin layer of dielectric applied thereto.

37. The method of claim 36 wherein the first force urging the first dynamic member to rotate is applied electrostatically.

38. The method of claim 37 wherein at least one of the torsion hinges of the first pair provided in the micromachined structure includes a torsion sensor for generating a signal that measures angular deflection of the first dynamic member with respect to the reference member; and wherein a feedback loop used in applying the electrostatic first force that urges the first dynamic member to rotate responds to the signal generated by the torsion sensor.

39. The method of claim 37 wherein the micromachined structure provided includes a capacitance sensor for generating a signal that measures angular deflection of the first dynamic member with respect to the reference member; and wherein a feedback loop used in applying the electrostatic first force that urges the first dynamic member to rotate responds to the signal generated by the capacitance sensor.

40. The method of claim 36 wherein the first force urging the first dynamic member to rotate is applied electromagnetically.

41. The method of claim 40 wherein at least one of the torsion hinges of the first pair provided in the micromachined structure includes a torsion sensor for generating a signal that measures angular deflection of the first dynamic member with respect to the reference member; and wherein a feedback loop used in applying the electromagnetic first force that urges the first dynamic member to rotate responds to the signal generated by the torsion sensor.

42. The method of claim 40 wherein the micromachined structure provided includes a capacitance sensor for generating a signal that measures angular deflection of the first dynamic member with respect to the reference member; and wherein a feedback loop used in applying the electromagnetic first force that urges the first dynamic member to rotate responds to the signal generated by the capacitance sensor.

43. The method of claim 36 wherein the second force urging the second dynamic member to rotate is applied electrostatically.

44. The method of claim 43 wherein at least one of the torsion hinges of the second pair provided in the micromachined structure includes a torsion sensor for generating a signal that measures angular deflection of the second dynamic member with respect to the frame; and wherein a feedback loop used in applying the electrostatic second force that urges the second dynamic member to rotate responds to the signal generated by the torsion sensor.

45. The method of claim 43 wherein the micromachined structure provided includes a capacitance sensor for generating a signal that measures angular deflection of the second dynamic member; and wherein a feedback loop used in applying the electrostatic second force that urges the second dynamic member to rotate responds to the signal generated by the capacitance sensor.

46. The method of claim 36 wherein the second force urging the second dynamic member to rotate is applied electromagnetically.

47. The method of claim 46 wherein at least one of the torsion hinges of the second pair provided in the micromachined structure includes a torsion sensor for generating a signal that measures angular deflection of the second dynamic member with respect to the frame; and wherein a feedback loop used in applying the electromagnetic second force that urges the second dynamic member to rotate responds to the signal generated by the torsion sensor.

48. The method of claim 46 wherein the micromachined structure provided includes a capacitance sensor for generating a signal that measures angular deflection of the second dynamic member; and wherein a feedback loop used in applying the electromagnetic second force that urges the second dynamic member to rotate responds to the signal generated by the capacitance sensor.

49. The method of claim 22 wherein the first force urging the first dynamic member to rotate is applied electrostatically.

50. The method of claim 49 wherein at least one of the torsion hinges of the first pair provided in the micromachined structure includes a torsion sensor for generating a signal that measures angular deflection of the first dynamic member with respect to the reference member; and wherein a feedback loop used in applying the electrostatic first force that urges the first dynamic member to rotate responds to the signal generated by the torsion sensor.

51. The method of claim 49 wherein the micromachined structure provided includes a capacitance sensor for generating a signal that measures angular deflection of the first dynamic member with respect to the reference member; and wherein a feedback loop used in applying the electrostatic first force that urges the first dynamic member to rotate responds to the signal generated by the capacitance sensor.

52. The method of claim 22 wherein the first force urging the first dynamic member to rotate is applied electromagnetically.

53. The method of claim 52 wherein at least one of the torsion hinges of the first pair provided in the micromachined structure includes a torsion sensor for generating a signal that measures angular deflection of the first dynamic member with respect to the reference member; and wherein a feedback loop used in applying the electromagnetic first force that urges the first dynamic member to rotate responds to the signal generated by the torsion sensor.

54. The method of claim 52 wherein the micromachined structure provided includes a capacitance sensor for generating a signal that measures angular deflection of the first dynamic member with respect to the reference member; and wherein a feedback loop used in applying the electromagnetic first force that urges the first dynamic member to rotate responds to the signal generated by the capacitance sensor.

55. The method of claim 22 wherein the second force urging the second dynamic member to rotate is applied electrostatically.

56. The method of claim 55 wherein at least one of the torsion hinges of the second pair provided in the micromachined structure includes a torsion sensor for generating a signal that measures angular deflection of the second dynamic member with respect to the frame; and wherein a feedback loop used in applying the electrostatic second force that urges the second dynamic member to rotate responds to the signal generated by the torsion sensor.

57. The method of claim 55 wherein the micromachined structure provided includes a capacitance sensor for generating a signal that measures angular deflection of the second dynamic member; and wherein a feedback loop used in applying the electrostatic second force that urges the second dynamic member to rotate responds to the signal generated by the capacitance sensor.

58. The method of claim 22 wherein the second force urging the second dynamic member to rotate is applied electromagnetically.

59. The method of claim 58 wherein at least one of the torsion hinges of the second pair provided in the micromachined structure includes a torsion sensor for generating a signal that measures angular deflection of the second dynamic member with respect to the frame; and wherein a feedback loop used in applying the electromagnetic second force that urges the second dynamic member to rotate responds to the signal generated by the torsion sensor.

60. The method of claim 58 wherein the micromachined structure provided includes a capacitance sensor for generating a signal that measures angular deflection of the second dynamic member; and wherein a feedback loop used in applying the electromagnetic second force that urges the second dynamic member to rotate responds to the signal generated by the capacitance sensor.

61. The method of claim 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59 or 60 wherein, for the first dynamic member of the micromachined structure provided, the vibrational frequency of the principal torsional vibrational mode is lower by at least 20% than the vibrational frequency of the vertical shaking vibrational mode.

62. The method of claim 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59 or 60 wherein, for the first dynamic member of the micromachined structure provided, the vibrational frequency of the principal torsional vibrational mode is lower by at least 20% than the vibrational frequency of the vertical rocking vibrational mode.

63. The method of claim 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59 or 60 wherein, for the first dynamic member of the micromachined structure provided, the vibrational frequency of the principal torsional vibrational mode is lower by at least 20% than the vibrational frequency of the lateral shaking vibrational mode.

64. The method of claim 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59 or 60 wherein, for the first dynamic member of the micromachined structure provided, the vibrational frequency of the principal torsional vibrational mode is lower by at least 20% than the vibrational frequency of the lateral rocking vibrational mode.

65. The method of claim 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59 or 60 wherein, for the first dynamic member of the micromachined structure provided, the vibrational frequency of the principal torsional vibrational mode is lower by at least 20% than the vibrational frequency of any other vibrational mode of the first dynamic member.

66. The method of claim 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59 or 60 wherein, for the second dynamic member of the micromachined structure provided, the vibrational frequency of the principal torsional vibrational mode is lower by at least 20% than the vibrational frequency of the vertical shaking vibrational mode.

67. The method of claim 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59 or 60 wherein, for the second dynamic member of the micromachined structure provided, the vibrational frequency of the principal torsional vibrational mode is lower by at least 20% than the vibrational frequency of the vertical rocking vibrational mode.

68. The method of claim 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59 or 60 wherein, for the second dynamic member of the micromachined structure provided, the vibrational frequency of the principal torsional vibrational mode is lower by at least 20% than the vibrational frequency of the lateral shaking vibrational mode.

69. The method of claim 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59 or 60 wherein, for the second dynamic member of the micromachined structure provided, the vibrational frequency of the principal torsional vibrational mode is lower by at least 20% than the vibrational frequency of the lateral rocking vibrational mode.

70. The method of claim 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59 or 60 wherein, for the second dynamic member of the micromachined structure provided, the vibrational frequency of the principal torsional vibrational mode is lower by at least 20% than the vibrational frequency of any other vibrational mode of the second dynamic member.

71. The method of claim 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59 or 60 wherein, for the first dynamic member and second dynamic member of the micromachined structure provided, the vibrational frequency of the principal torsional vibrational mode of the first dynamic member is lower than the principal torsional vibrational mode of the second dynamic member.

* * * * *